US012656518B2

(12) United States Patent
Zhou et al.

(10) Patent No.: US 12,656,518 B2
(45) Date of Patent: Jun. 16, 2026

(54) INTEGRATED PULSED NEUTRON LOGGING TOOL FOR SPECTROSCOPY AND POROSITY MEASUREMENTS

(71) Applicant: Halliburton Energy Services, Inc., Houston, TX (US)

(72) Inventors: Zilu Zhou, Houston, TX (US); Gregory Joseph Schmid, Houston, TX (US); Megha Ledala, Houston, TX (US); Mayir Mamtimin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 184 days.

(21) Appl. No.: 18/747,153

(22) Filed: Jun. 18, 2024

(65) Prior Publication Data

US 2025/0383470 A1　Dec. 18, 2025

(51) Int. Cl.
| | |
|---|---|
| *E21B 49/00* | (2006.01) |
| *E21B 47/00* | (2012.01) |
| *G01V 1/04* | (2006.01) |
| *G01V 5/04* | (2006.01) |
| *G01V 5/10* | (2006.01) |

(52) U.S. Cl.
CPC .............. *G01V 5/102* (2013.01); *E21B 47/00* (2013.01); *E21B 49/00* (2013.01); *G01V 5/04* (2013.01); *G01V 5/105* (2013.01)

(58) Field of Classification Search
CPC ........... E21B 47/00; E21B 49/00; G01V 5/04; G01V 5/102; G01V 5/105
See application file for complete search history.

(56) References Cited

U.S. PATENT DOCUMENTS

| | | | |
|---|---|---|---|
| 5,293,410 | A | 3/1994 | Chen et al. |
| 9,217,793 | B2 | 12/2015 | Zhou et al. |
| 9,304,214 | B2 | 4/2016 | Zhou et al. |
| 9,304,226 | B2 | 4/2016 | Berheide et al. |
| 9,322,262 | B2 | 4/2016 | Chirovsky et al. |

(Continued)

OTHER PUBLICATIONS

Werner, Christopher J., et al. MCNP User's Manual Code Version 6.2. Los Alamos National Laboratory, 2017. LA-UR-17-29981. PDF file.

(Continued)

*Primary Examiner* — Mark R Gaworecki
(74) *Attorney, Agent, or Firm* — Benjamin Ford; C. Tumey Law Group PLLC

(57) ABSTRACT

A system and a method for a pulsed neutron logging tool. The pulsed neutron logging tool may include a pulsed neutron generator for generating one or more neutrons, one or more gamma ray scintillator detectors disposed in a detection area, a shielding block that separates the pulsed neutron generator from the one or more gamma ray scintillator detectors, and a shielding layer. The pulsed neutron logging tool may further comprise an information handling system communicatively connected at least in part to the pulsed neutron logging tool. The information handling system is configured to create a gamma ray spectrum from the one or more gamma rays detected by the one or more gamma ray scintillator detectors, remove a background from the gamma ray spectrum to form a peaks-only spectrum, and compare one or more peaks-only elemental standards to the peaks-only spectrum to determine an elemental weight and yield.

20 Claims, 23 Drawing Sheets

(56)                    References Cited

U.S. PATENT DOCUMENTS

| 11,681,069 | B1 | 6/2023 | Mamtimin et al. |
| 11,994,647 | B2 | 5/2024 | Mamtimin et al. |
| 2006/0033023 | A1 | 2/2006 | Pemper et al. |
| 2009/0242746 | A1 | 10/2009 | Pemper et al. |
| 2011/0049345 | A1 | 3/2011 | Roberts |
| 2014/0319330 | A1 | 10/2014 | Berheide et al. |
| 2017/0184759 | A1 | 6/2017 | Roscoe et al. |
| 2021/0373193 | A1 | 12/2021 | Mamtimin et al. |
| 2021/0373194 | A1 | 12/2021 | Mamtimin et al. |
| 2021/0373195 | A1 | 12/2021 | Mamtimin et al. |
| 2022/0171086 | A1 | 6/2022 | Mamtimin et al. |
| 2022/0171088 | A1 | 6/2022 | Mamtimin et al. |
| 2022/0317330 | A1 | 10/2022 | Mamtimin et al. |
| 2022/0413180 | A1 | 12/2022 | Zhan et al. |
| 2023/0060188 | A1 | 3/2023 | Mamtimin et al. |
| 2023/0288602 | A1 | 9/2023 | Mamtimin et al. |
| 2023/0314652 | A1 | 10/2023 | Mamtimin |
| 2023/0350094 | A1 | 11/2023 | Zhou et al. |
| 2023/0380046 | A1 | 11/2023 | Zhou et al. |
| 2024/0114612 | A1 | 4/2024 | Zhou et al. |

OTHER PUBLICATIONS

Schlumberger. EcoScope Multifunction LWD Service. Schlumberger, 2017. 17-DR-272647. PDF file. 3 pages.

Schlumberger. Litho Scanner High-definition Spectroscopy Service. Schlumberger, 2017. 17-FE-259463. PDf file. 20 pages.

Schlumberger. Pulsar Multifunction Spectroscopy Service. Schlumberger, 2019. 19-PR-546216. PDF file. 2 pages.

Halliburton. "RMT-3D™ Reservoir Monitor Tool for Oil, Water, and Gas Saturation." Company Website, https://www.halliburton.com/en/products/reservoir-monitor-tool-3-detector. Accessed Jul. 10, 2024.

Reifenschweiler, O. "Sealed-Off Neutron Tube: The Underlying Research Work." Philips Research Reports, vol. 16, No. 5, Oct. 1961. pp. 401-418. PDF file. 18 pages.

Chen, Jianxing, et al. A New Cased-Hole 2 1/8-in. Multi-Detector Pulsed-Neutron Tool: Theory and Characterization. SPWLA 56th Annual Logging Symposium, 2015. SPWLA-2015-AAA. PDF file. 11 pages.

Ryan, C.G., et al. "SNIP, A Statistics-Sensitive Background Treatment for the Quantitative Analysis Of PIXE Spectra in Geoscience Applications." Nuclear Instruments and Methods in Physics Research Section B: Beam Interactions with Materials and Atoms, vol. 34, No. 3, Sep. 1988. pp. 396-402. PDF file. 7 pages.

Haranger, Fabien, et al. A Step Change in Neutron-Induced Gamma Ray Spectroscopy: Using a High-Resolution LABR3:CE Detector in an Integrated LWD Tool. SPWLA 64th Annual Logging Symposium, 2023. SPWLA-2023-0121. PDF file. 17 pages.

Darwin V. Ellis & Julian M. Singer. Well Logging for Earth Scientists. pp. 351-52, 383. (2nd ed. 2007). PDF file. 8 pages.

Julius Csikai. CRC Handbook of Fast Neutron Generators. pp. 4, 7-8, 22, 25, 77-78, 99. (vol. I 1987). PDF file. 11 pages.

United States Patent Office U.S. Appl. No. 18/412,019, filed Jan. 12, 2024.

United States Patent Office U.S. Appl. No. 18/651,141, filed Apr. 30, 2024.

International Search Report and Written Opinion for International Patent Application No. PCT/US2024/036225 dated Feb. 25, 2025. PDF file. 9 pages.

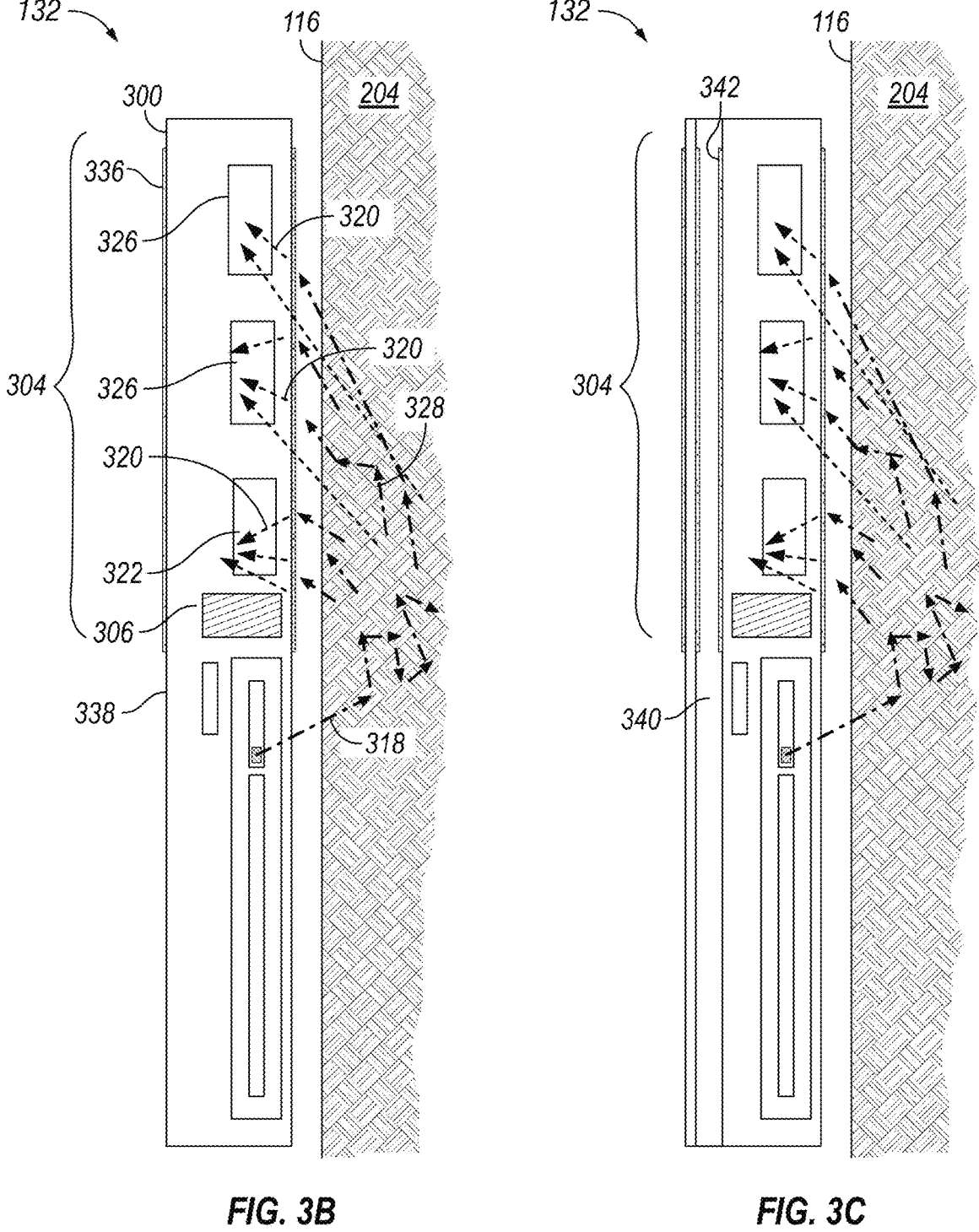
*FIG. 3B*                    *FIG. 3C*

2000

2002 — CONFIGURATION OF A PULSED NEUTRON LOGGING TOOL

2004 — DISPOSING THE PULSED NEUTRON LOGGING TOOL INTO A FORMATION FOR MEASUREMENT OPERATIONS

2006 — EXTRACTING PEAK HEIGHTS FROM A GAMMA RAY SPECTRUM

2008 — DETERMINE ONE OR MORE ELEMENTAL YIELDS

2010 — DETERMINE FORMATION NEUTRON POROSITY IDENTIFY FORMATION MINERALOGY/LITHOLOGY

INTEGRATED PULSED NEUTRON LOGGING TOOL FOR SPECTROSCOPY AND POROSITY MEASUREMENTS

BACKGROUND

Wellbores drilled into subterranean formations may enable recovery of desirable fluids (e.g., hydrocarbons) using a number of different techniques. During drilling operations, slickline operations, or during wireline operations, measurements may be taken to determine the presence of oil, water, gas, and/or the like. One such device that may be utilized for these measurements may be a pulsed neutron tool. The pulsed neutron tool may comprise a pulsed neutron generator (PNG) that may operate and function to transmit neutrons into a formation for either logging while drilling (LWD) or wireline logging measurements.

BRIEF DESCRIPTION OF THE DRAWINGS

These drawings illustrate certain aspects of some examples of the present disclosure and should not be used to limit or define the disclosure.

FIGS. 3A-3C are diagrams of illustrative embodiments of a pulsed neutron logging tool.

DETAILED DESCRIPTION

Figure 1:
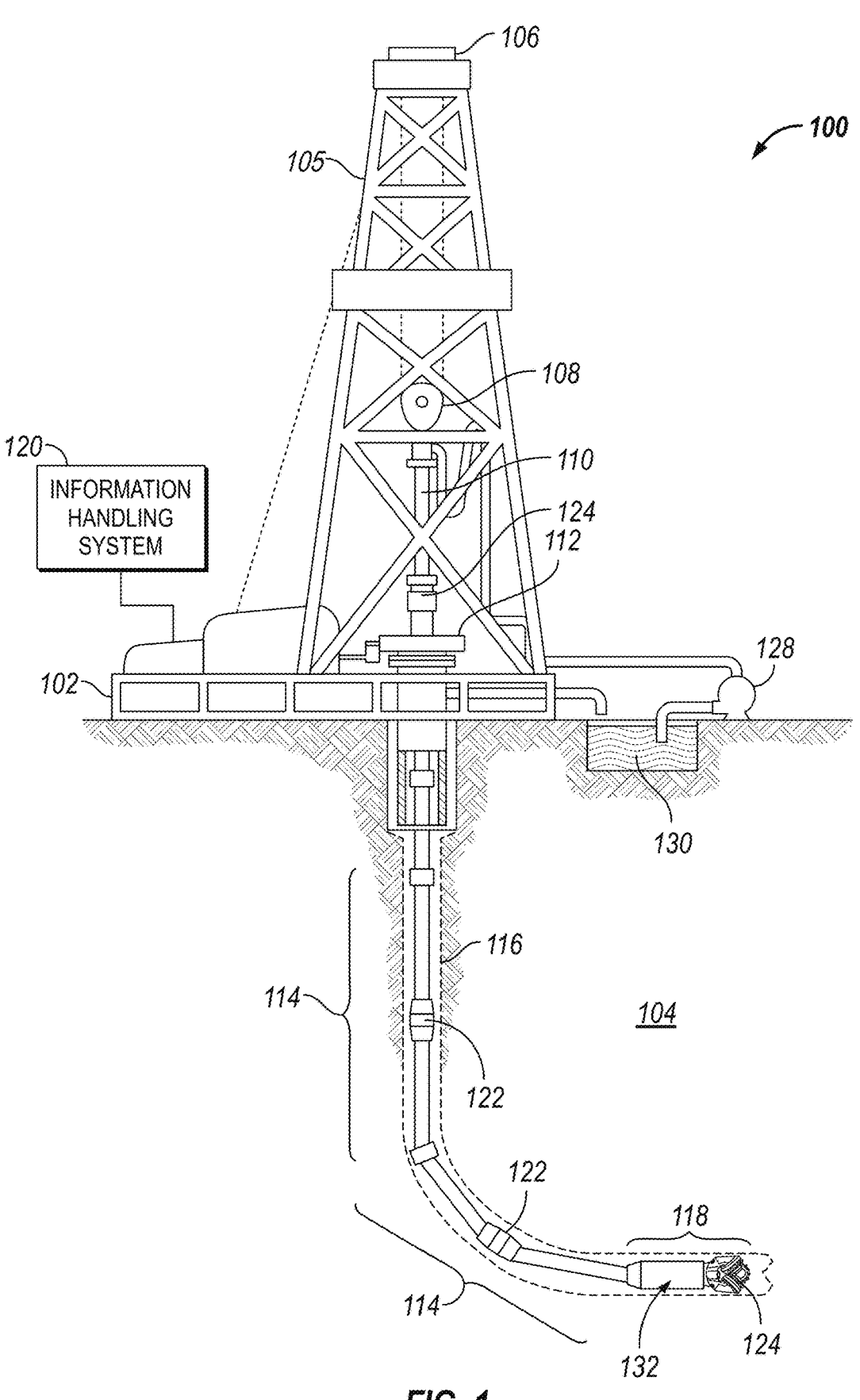
FIG. 1 illustrates a logging while drilling operation utilizing a pulsed neutron logging tool, in accordance with examples of the present disclosure.

The present disclosure generally relates to systems and methods for measurement operations utilizing a pulsed neutron logging tool in a logging while drilling (LWD) and/or a wireline operation. As disclosed below, the pulsed neutron logging tool may comprise a pulsed neutron generator rather than a chemical neutron source. A pulsed neutron generator may allow for higher neutron yields, higher energy fast neutrons, and may further allow for computer-based timing for the pulsing and broadcasting of neutrons during a measurement operation. Various pulsing schemes may be configured and utilized to produce sharp and narrow neutron pulses or bursts by a neutron generator to realize different neutron measurements. Measurements may comprise borehole fluidic, and formation capture sigma (Sigma), carbon-oxygen ratio (CO), fast neutron inelastic and thermal neutron capture spectroscopy, in addition to formation neutron porosity.

Currently, during wireline operations, neutron porosity measurements have been taken in well logging for oil exploration. A neutron porosity tool, together with density and resistivity measurements, forms a so-called "Triple Combo", and is commenced for formation measurements in nearly every oil well. It consists of a neutron source, which is typically AmBe, and multiple thermal neutron detectors, for example, proportional counters filled with high pressure $^3$He gas referring as $^3$He tubes, positioned at various distances from the neutron source for thermal neutron detection.

At the same time, integrated pulsed neutron logging tools, comprising of a pulsed neutron generator and multiple scintillator detectors, have also been widely utilized for formation measurements both in wireline and LWD applications for oil wells. With a pulsed neutron generator, not only having higher neutron yields, higher energy fast neutrons, but also pulsing timing information, many neutron physics or measurements become available compared with a neutron source such as AmBe. Various pulsing schemes have been utilized by configuring the generator to produce sharp and narrow neutron pulses or bursts to realize different neutron measurements (referring as spectroscopy): such as formation capture sigma (Sigma), carbon-oxygen ratio (C/O), fast neutron inelastic and thermal neutron capture elemental spectroscopy.

However, combining the two measurements of porosity and spectroscopy in one integrated pulsed neutron logging tool has been a challenge. Not only there is a space constraint of packaging two sets of multiple $^3$He tubes and scintillator detectors, but also there are physics conflicts between the two measurements, which are disclosed below. By simply deploying both tools individually in the same tool string, either in wireline or in LWD applications as presently done for the simultaneous measurements is not cost effective with resources. In addition, in the same tool string, there may be a need for two neutron sources or neutron generators. Consequently, there may be fluidic or formation activations impacting each other measurements, especially in the LWD application which has drilling mud circulation. Additionally, deploying them separately in different logging trips may incur time spent in the oil well for wireline but may not be practical for LWD. Thus, there is a need for a logging tool to take all measurements downhole that currently utilize two different types of tools.

FIG. 1 is a diagram of an example drilling environment. Drilling environment 100 may include platform 102 that supports derrick 105 having a traveling block 108 for raising and lowering top drive 110 and drillstring 114. Top drive 110 supports and rotates drillstring 114 as it is lowered through wellhead 112. In turn, drill bit 124, located at the end of drillstring 114, may create borehole 116. Borehole 116 may be formed through the Earth surface into a subterranean formation 104 in the Earth crust. Bottom-hole assembly 118 may include a pulsed neutron logging tool 132 (e.g., having a scintillator that is LaBr$_3$, CeBr$_3$ or other types of scintillation materials) for logging while drilling operations. Each of these components is described below. Pulsed neutron logging tool 132 may be a dual-purpose (dual application) gamma-ray spectroscopy logging tool in contemporaneously (e.g., simultaneously) detecting (facilitating measuring) both (1) neutron-induced gamma rays from the subterranean formation 104 and (2) natural gamma rays from the subterranean formation 104. In implementations for logging while drilling, such dual application can reduce complexity of bottom-hole assembly 118 and save rig time in facilitating spectroscopic measurements of both neutron-induced gamma rays and natural gamma rays in a single run (in the same run) into borehole 116.

Platform 102 is a structure which may be used to support one or more other components of drilling environment 100 (e.g., derrick 105). Platform 102 may be designed and constructed from suitable materials (e.g., concrete) which are able to withstand the forces applied by other components (e.g., the weight and counterforces experienced by derrick 105). In any embodiment, platform 102 may be constructed to provide a uniform surface for drilling operations in drilling environment 100.

Derrick 105 is a structure which may support, contain, and/or otherwise facilitate the operation of one or more pieces of the drilling equipment. In any embodiment, derrick 105 may provide support for crown block 106, traveling block 108, and/or any part connected to (and including) drillstring 114. Derrick 105 may be constructed from any suitable materials (e.g., steel) to provide the strength necessary to support those components.

Crown block 106 is one or more simple machine(s) which may be rigidly affixed to derrick 105 and include a set of pulleys (e.g., a "block"), threaded (e.g., "reeved") with a drilling line (e.g., a steel cable), to provide mechanical advantage. Crown block 106 may be disposed vertically above traveling block 108, where traveling block 108 is threaded with the same drilling line.

Traveling block 108 is one or more simple machine(s) which may be movably affixed to derrick 105 and include a set of pulleys, threaded with a drilling line, to provide mechanical advantage. Traveling block 108 may be disposed vertically below crown block 106, where crown block 106 is threaded with the same drilling line. In any embodiment, traveling block 108 may be mechanically coupled to drillstring 114 (e.g., via top drive 110) and allow for drillstring 114 (and/or any component thereof) to be lifted from (and out of) borehole 116. Both crown block 106 and traveling block 108 may use a series of parallel pulleys (e.g., in a "block and tackle" arrangement) to achieve significant mechanical advantage, allowing for the drillstring to handle greater loads (compared to a configuration that uses non-parallel tension). Traveling block 108 may move vertically (e.g., up, down) within derrick 105 via the extension and retraction of the drilling line.

Top drive 110 is a machine which may be configured to rotate drillstring 114. Top drive 110 may be affixed to traveling block 108 and configured to move vertically within derrick 105 (e.g., along with traveling block 108). In any embodiment, the rotation of drillstring 114 (caused by top drive 110) may allow for drillstring 114 to carve borehole 116. Top drive 110 may use one or more motor(s) and gearing mechanism(s) to cause rotations of drillstring 114. In any embodiment, a rotary table (not shown) and a "Kelly" drive (not shown) may be used in addition to, or instead of, top drive 110.

Wellhead 112 is a machine which may include one or more pipes, caps, and/or valves to provide pressure control for contents within borehole 116 (e.g., when fluidly connected to a well (not shown)). In any embodiment, during drilling, wellhead 112 may be equipped with a blowout preventer (not shown) to prevent the flow of higher-pressure fluids (in borehole 116) from escaping to the surface in an uncontrolled manner. Wellhead 112 may be equipped with other ports and/or sensors to monitor pressures within borehole 116 and/or otherwise facilitate drilling operations.

Drillstring 114 is a machine which may be used to carve borehole 116 and/or gather data from borehole 116 and the surrounding geology. Drillstring 114 may include one or more drillpipe(s), one or more repeater(s) 122, and bottom-hole assembly 118. Drillstring 114 may rotate (e.g., via top drive 110) to form and deepen borehole 116 (e.g., via drill bit 124) and/or via one or more motor(s) attached to drillstring 114.

Borehole 116 is a hole in the ground which may be formed by drillstring 114 (and one or more components thereof). Borehole 116 may be partially or fully lined with casing to protect the surrounding ground from the contents of borehole 116, and conversely, to protect borehole 116 from the surrounding ground.

Bottom-hole assembly 118 is a machine which may be equipped with one or more tools for creating, providing structure, and maintaining borehole 116, as well as one or more tools for measuring the surrounding environment (e.g., measurement while drilling (MWD), logging while drilling (LWD)). In any embodiment, bottom-hole assembly 118 may be disposed at (or near) the end of drillstring 114 (e.g., in the most "downhole" portion of borehole 116).

Non-limiting examples of tools that may be included in bottom-hole assembly 118 include a drill bit (e.g., drill bit 124), casing tools (e.g., a shifting tool), a plugging tool, a mud motor, a drill collar (thick-walled steel pipes that provide weight and rigidity to aid the drilling process), actuators (and pistons attached thereto), a steering system, and any measurement tool (e.g., sensors, probes, particle generators, etc.).

Further, bottom-hole assembly 118 may include a telemetry sub to maintain a communications link with the surface (e.g., with information handling system 120). Such telemetry communications may be used for (i) transferring tool measurement data from bottom-hole assembly 118 to surface receivers, and/or (ii) receiving commands (from the surface) to bottom-hole assembly 118 (e.g., for use of one or more tool(s) in bottom-hole assembly 118). In examples, telemetry communications may be at least in part between bottom-hole assembly 118 and information handling system 120.

As illustrated, the information handling system 120 may comprise any instrumentality or aggregate of instrumentalities operable to compute, estimate, classify, process, transmit, broadcast, receive, retrieve, originate, switch, store, display, manifest, detect, record, reproduce, handle, or utilize any form of information, intelligence, or data for business, scientific, control, or other purposes. For example, an information handling system 120 may be a personal computer, a network storage device, or any other suitable device and may vary in size, shape, performance, functionality, and price.

Information handling system 120 may include a processing unit (e.g., microprocessor, central processing unit, etc.) that may process measurements from pulsed neutron logging tool 132, discussed below, by executing software or instructions obtained from a local non-transitory computer readable media (e.g., optical disks, magnetic disks). The non-transitory computer readable media may store software or instructions of the methods described herein. Non-transitory computer readable media may include any instrumentality or aggregation of instrumentalities that may retain data and/or instructions for a period of time. Non-transitory computer readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 120 may also include input device(s) (e.g., keyboard, mouse, touchpad, etc.) and output device(s) (e.g., monitor, printer, etc.). The input device(s) and output device(s) provide a user interface that enables an operator to interact with any device disposed or a part of bottom-hole assembly 118, discussed below, and/or software executed by a processing unit. For example, information handling system 120 may enable an operator to select analysis options, view collected log data, view analysis results, and/or perform other tasks.

Non-limiting examples of techniques for transferring tool measurement data (to the surface) include mud pulse telemetry and through-wall acoustic signaling. For through-wall acoustic signaling, one or more repeater(s) 122 may detect, amplify, and re-transmit signals from bottom-hole assembly 118 to the surface (e.g., to information handling system 120), and conversely, from the surface (e.g., from information handling system 120) to bottom-hole assembly 118.

Repeater 122 is a device which may be used to receive and send signals from one component of drilling environment 100 to another component of drilling environment 100. As a non-limiting example, repeater 122 may be used to receive a signal from a tool on bottom-hole assembly 118 and send that signal to information handling system 120. Two or more repeaters 122 may be used together, in series, such that a signal to/from bottom-hole assembly 118 may be relayed through two or more repeaters 122 before reaching its destination.

A transducer is a device that may work with repeater 122 to transfer information from the surface to bottom-hole assembly 118. A transducer may be configured to convert non-digital data (e.g., vibrations, other analog data) into a digital form suitable for information handling system 120. As a non-limiting example, the one or more transducer(s) may convert signals between mechanical and electrical forms, enabling information handling system 120 to receive the signals from a telemetry sub, on bottom-hole assembly 118, and conversely, transmit a downlink signal to the telemetry sub on bottom-hole assembly 118. In any embodiment, the transducer may be located at the surface and/or any part of drillstring 114 (e.g., as part of bottom-hole assembly 118).

Drill bit 124 is a machine which may be used to cut through, scrape, and/or crush (i.e., break apart) materials in the ground (e.g., rocks, dirt, clay, etc.). Drill bit 124 may be disposed at the frontmost point of drillstring 114 and bottom-hole assembly 118. In any embodiment, drill bit 124 may include one or more cutting edges (e.g., hardened metal points, surfaces, blades, protrusions, etc.) to form a geometry which aids in breaking ground materials loose and further crushing that material into smaller sizes. In any embodiment, drill bit 124 may be rotated and forced into (i.e., pushed against) the ground material to cause the cutting, scraping, and crushing action. The rotations of drill bit 124 may be caused by top drive 110 and/or one or more motor(s) located on drillstring 114 (e.g., on bottom-hole assembly 118).

Pump 128 is a machine that may be used to circulate drilling fluid 130 from a reservoir, through a feed pipe, to derrick 105, to the interior of drillstring 114, out through drill bit 124 (through orifices, not shown), back upward through borehole 116 (around drillstring 114), and back into the reservoir. In any embodiment, any appropriate pump 128 may be used (e.g., centrifugal, gear, etc.) which is powered by any suitable means (e.g., electricity, combustible fuel, etc.).

Drilling fluid 130 is a liquid which may be pumped through drillstring 114 and borehole 116 to collect drill cuttings, debris, and/or other ground material from the end of borehole 116 (e.g., the volume most recently hollowed by drill bit 124). Further, drilling fluid 130 may provide conductive cooling to drill bit 124 (and/or bottom-hole assembly 118). In any embodiment, drilling fluid 130 may be circulated via pump 128 and filtered to remove unwanted debris.

During drilling operations, bottom-hole assembly may comprise, at least in part, a pulsed neutron logging tool 132. This may allow for logging while drilling operations to be performed. Measurements taken by pulsed neutron logging tool 132 may be gathered and/or processed by information handling system 120. For example, measurements taken by pulsed neutron logging tool 132 may be sent to information handling system 120 where they may be stored on memory and then processed. The processing may be performed real-time during data acquisition or after recovery of pulsed neutron logging tool 132. Processing may alternatively occur downhole on an information handling system disposed on and/or near pulsed neutron logging tool 132 or may occur both downhole and at surface. Information handling system 120 may process the signals, and the information contained therein may be displayed for an operator to observe and stored for future processing and reference. Information handling system 120 may also contain an apparatus for supplying control signals and power to pulsed neutron logging tool 132. Although illustrated as disposed on bottom-hole assembly 118 in a drilling operation, pulsed neutron logging tool 132 may also be disposed in borehole 116 in a wireline operation. Moreover, as mentioned, pulsed neutron logging tool 132 can have a scintillator detector having a scintillator (scintillation crystal) that is or includes $LaBr_3$, $CeBr_3$ or other types of scintillation materials.

Figure 2:
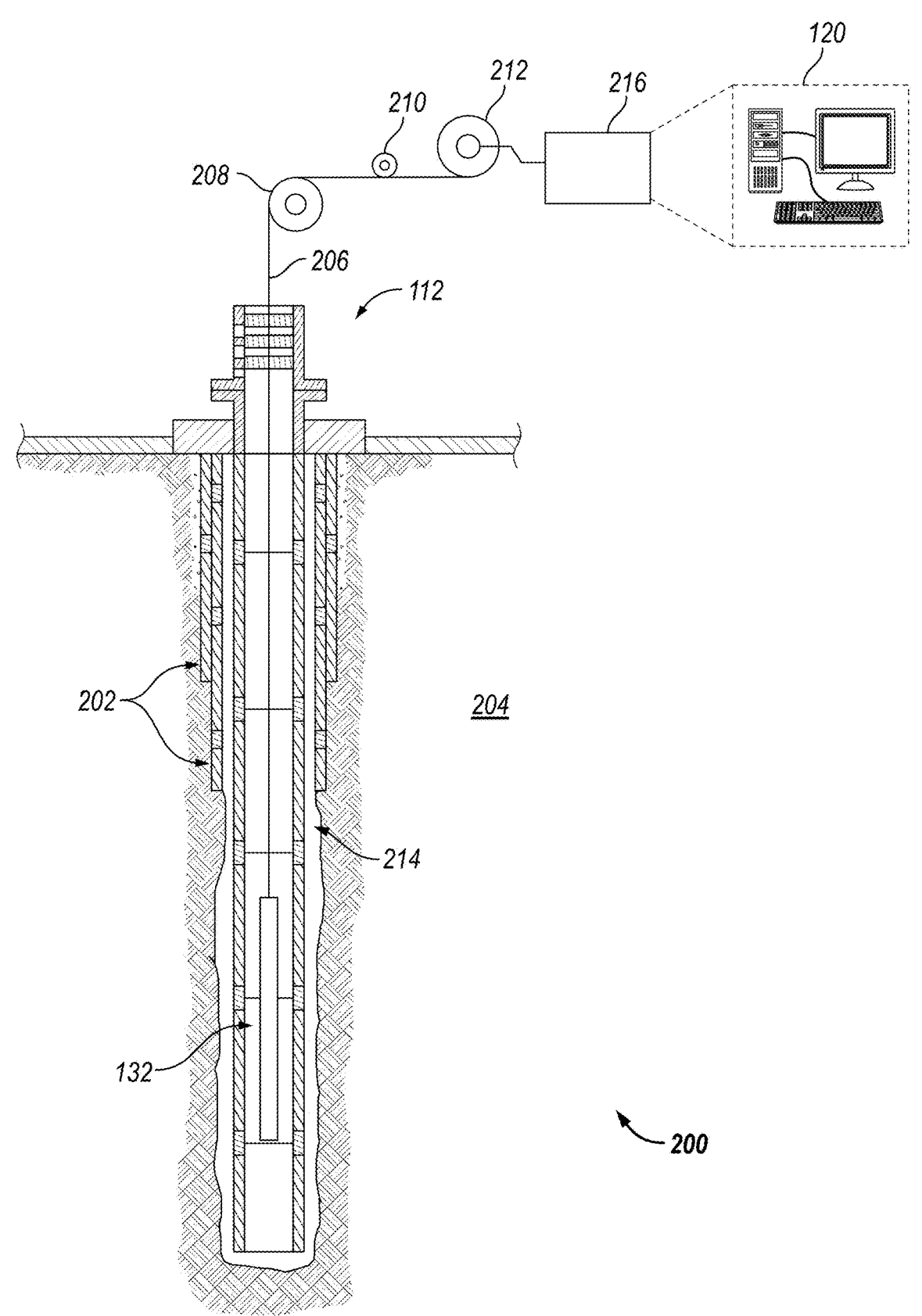
FIG. 2 illustrates the pulsed neutron logging tool in a wireline operation, in accordance with examples of the present disclosure.

FIG. 2 illustrates a wireline operation 200, as disclosed herein, utilizing a pulsed neutron logging tool 132. Pulsed neutron logging tool 132 can have a scintillator detector in which the scintillator may be or include $LaBr_3$, $CeBr_3$ or other types of scintillation materials. FIG. 2 illustrates a cross-section of borehole 116 with a pulsed neutron logging tool 132 traveling through casing string 202. Borehole 116 may traverse through subterranean formation 204 as a vertical well and/or a horizontal well. Pulsed neutron logging tool 132 may be suspended by a conveyance 206, which communicates power from a logging center 216 to pulsed neutron logging tool 132 and communicates telemetry from pulsed neutron logging tool 132 to information handling system 120. In examples, pulsed neutron logging tool 132 may be operatively coupled to a conveyance 206 (e.g., wireline, slickline, coiled tubing, pipe, downhole tractor, and/or the like) which may provide mechanical suspension, as well as electrical connectivity, for pulsed neutron logging tool 132. Conveyance 206 and pulsed neutron logging tool 132 may extend within casing string 202 to a depth within borehole 116. Conveyance 206, which may include one or more electrical conductors, may exit wellhead 112, may pass around pulley 208, may engage odometer 210, and may be reeled onto winch 212, which may be employed to raise and lower the tool assembly in borehole 116. Wellhead 112 may allow for entry into borehole 116 and placement of pulsed neutron logging tool 132 into pipe string 214. The position of pulsed neutron logging tool 132 may be monitored in a number of ways, including an inertial tracker in pulsed neutron logging tool 132 and a paid-out conveyance length monitor in logging facility 216.

Multiple such measurements may be desirable to enable the system to compensate for varying cable tension and cable stretch due to other factors. Information handling system 120 in logging facility 216 collects telemetry and position measurements and provides position-dependent logs of measurements from pulsed neutron logging tool 132 and values that may be derived therefrom.

Pulsed neutron logging tool 132 generally includes multiple instruments for measuring a variety of downhole parameters. Wheels, bow springs, fins, pads, or other centralizing mechanisms may be employed to keep pulsed neutron logging tool 132 near the borehole axis during measurement operations. During measurement operations, generally, measurements may be performed as pulsed neutron logging tool 132 is drawn up hole at a constant rate. The parameters and instruments may vary depending on the needs of the measurement operation.

Measurements taken by pulsed neutron logging tool 132 may be gathered and/or processed by information handling system 120. For example, signals recorded by pulsed neutron logging tool 132 may be sent to information handling system 120 where they may be stored on memory and then processed. The processing may be performed real-time during data acquisition or after recovery of pulsed neutron logging tool 132. Processing may alternatively occur downhole on an information handling system disposed on pulsed neutron logging tool 132 or may occur both downhole and at surface. In some examples, signals recorded by pulsed neutron logging tool 132 may be conducted to information handling system 120 by way of conveyance 206. Information handling system 120 may process the signals, and the information contained therein may be displayed for an operator to observe and stored for future processing and reference. Information handling system 120 may also contain an apparatus for supplying control signals and power to pulsed neutron logging tool 132.

In wireline operations 200, a digital telemetry system may be employed, wherein an electrical circuit may be used to both supply power to pulsed neutron logging tool 132 and to transfer data between information handling system 120 and pulsed neutron logging tool 132. A DC voltage may be provided to pulsed neutron logging tool 132 by a power supply located above ground level, and data may be coupled to the DC power conductor by a baseband current pulse system. Alternatively, pulsed neutron logging tool 132 may be powered by batteries located within the downhole tool assembly, and/or the data provided by pulsed neutron logging tool 132 may be stored within the downhole tool assembly, rather than transmitted to the surface during logging.

Neutron porosity measurements, which may be taken by a neutron porosity tool, have been widely deployed in well logging for oil exploration. Neutron porosity tool may comprise of a neutron source, either a chemical source such as AmBe or a pulsed neutron generator, and multiple thermal neutron detectors, for example, proportional counters filled with high pressure $^3He$ gas referring as $^3He$ tubes, positioned at various distances from the neutron source for detecting epi-thermal and thermal neutrons scattered from the earth formation.

Neutrons are neutral particles and thus require conversion to be detectable. $^3He$ tubes are thermal neutron detectors based on the $^3He(n, p)^3H$ capture reaction with a very large cross section, where both p and $^3H$ are detectable charged particles with a total of 0.763 MeV energy in the proportional counters. One advantage is that $^3He$ tubes may be virtually insensitive to gamma rays. However, $^3He$ gas is presently scarcely available.

Similarly, $^6Li$ and $^{10}B$ materials also have very high thermal neutron capture cross sections, through $^6Li(n, \alpha)^3H+4.8$ McV and $^{10}B(n, \alpha)$ $^7Li+2.8$ (6%) or 2.3 (94%) MeV reactions. The products of these reactions may be charged particles which may be detected. Thus, these materials may be embedded or attached to solid-state detectors or gas proportional counters for neutron detection, also with little sensitivity to gamma rays. $BF_3$ gas counters and $^6Li$ embedded semi-conductor devices ranging from silicon to diamond. In addition, densely packed straw proportional counters with $^{10}B$ lined walls have been developed with high detection efficiency to replace $^3He$ tubes for neutron porosity measurements.

Recently, $^6Li$-based scintillator detectors such as CLYC ($Cs_2LiYCl_6$ materials) or LiCAF ($LiCaAlF_6$ crystal doped with Eu) have been also found to be effective thermal neutron detectors. These scintillators may detect the converted alpha and $^3H$ charged particles which share a large amount of energy, ionize and generate electronic signals inside the crystals. With a pulse shape discrimination, the neutron converted signals may be identified in the presence of high gamma ray background which is typical with a neutron logging tool due to neutron inelastic and neutron capture reactions in the earth formation.

In the $^{10}B$ (n, $\alpha$) $^7Li$ reaction, 94% of time, the $^7Li$ is in the excited state, which may immediately decay to the ground state and release a "prompt" gamma ray with an energy of 0.48 MeV. This gamma ray of 0.48 MeV can be detected in a scintillator and therefore, by inference, for thermal neutron detection. Thus, $^{10}B$ sheet materials may be used to wrap up a scintillator detector to convert thermal neutrons to 0.48 MeV gamma rays, as an alternative to ³He tubes, for thermal neutron detection.

Many scintillator detectors with a variety of scintillation materials or crystals in various forms are commonly available. For example, to name a few, there are Sodium Iodide (NaI), Gadolinium-oxyortho-slicate (GSO), and Bismuth Germanate (BGO), Lanthanum Chloride (LaCl₃), Lanthanum Bromide (LaBr₃), Cerium Bromide (CeBr₃), and Yttrium Aluminum Perovskite (YAP). Some of these scintillators have intrinsic fast responses (~25 ns), high energy resolutions (~4% at 0.66 MeV), high detection efficiencies and less internal radiation backgrounds. If equipped with corresponding fast photo-multiplier tubes (PMT) and read-out electronics, they may be gamma ray detectors for detecting gamma rays from neutron inelastic and neutron capture of formation 204 in pulsed neutron logging tool 132.

Indeed, many integrated pulsed neutron logging tools 132, which may comprise of a pulsed neutron generator 308 (e.g., referring to FIG. 3A, discussed below) and multiple scintillator detectors (i.e., near gamma ray scintillator detector 322, far gamma ray scintillator detector 324, and long gamma ray scintillator detector 326 (e.g., referring to FIG. 3A, discussed below)), have been widely deployed for formation measurements both in wireline and LWD applications for oil wells. With pulsed neutron generator 308, not only having higher neutron yields, higher energy fast neutrons, but also pulsing timing information, many neutron physics or measurements become available. These measurements include, for example, formation capture sigma (Sigma), carbon-oxygen ratio (C/O), fast neutron inelastic and thermal neutron capture elemental spectroscopy. The multi-detector technique allows ratios of detector measurements, which may be less vulnerable to errors/fluctuations and more direct to the results of measurements. The multi-spacing technique also allows the multi-depths of investigation of formation 204, with a proper arrangement of these detector spacings.

With above stated two widely deployed neutron porosity logging tool for thermal neutron detection, and integrated pulsed neutron logging tool for gamma ray spectroscopy measurements, there is a great interest in merging them to save resources or using a common pulsed neutron generator.

Figure 3A:
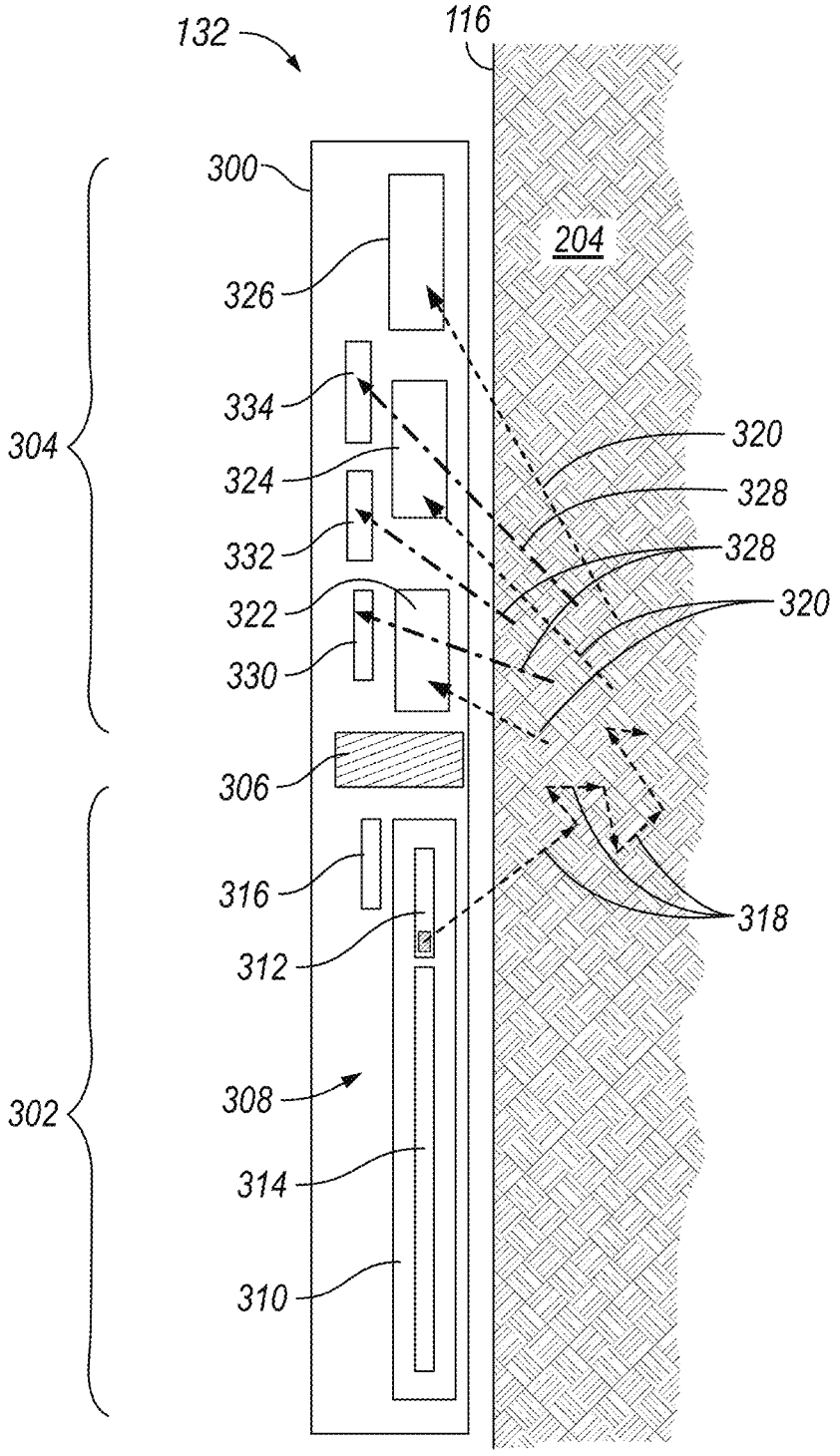

FIG. 3A illustrates pulsed neutron logging tool 132 disposed in borehole 116. It should be noted, as discussed above, that pulsed neutron logging tool 132 may be disposed on a bottom-hole assembly 118 (e.g., referring to FIG. 1) in a logging while drilling operation or utilized in a wireline operation (e.g., referring to FIG. 2). Additionally, the orientation of pulsed neutron logging tool 132, whether the generator is disposed above or below the detectors, is inconsequential.

With continued reference to FIG. 3A, pulsed neutron logging tool 132 may comprise an outer housing 300 which may be formed from a heavy metal such as steel, Inconel, etc. Housing 300 may protect the internal devices of pulsed neutron logging tool 132 from the downhole environment that pulsed neutron logging tool 132 may experience in borehole 116. As illustrated, pulsed neutron logging tool 132 may be divided into a generation area 302 and a detection area 304 that are separated by shielding block 306. From generation area 302, neutrons may be generated and broadcast into formation 204 (referring to FIG. 2). Detection area 304 may be operated and function to detect gamma rays that may originate from formation 204 naturally or induced by the broadcast of neutrons into formation 204.

Generation area 302 may comprise a pulsed neutron generator 308 that may be packaged within SF₆ housing 310.

SF₆ housing 310 may be comprised of a heavy metal like stainless steel, etc. As noted above, within SF₆ housing 310 may be a pulsed neutron generator 308 that may further comprise a neutron tube 312, which generates neutrons for broadcasting, and a high voltage (HV) ladder power supply 314 that may be utilized to power neutron tube 312. In other examples, pulsed neutron generator 308 may be replaced with a continuous neutron source such as Americium-Beryllium (Am—Be) chemical source. Outside of SF₆ housing 310 may be a fast neutron monitor 316, that may be utilized to monitor the broadcasting of neutrons 318 from generation area 302 into formation 204. For example, during operations pulsed neutron logging tool 132 may generate pulses of high energy neutrons that radiate from pulsed neutron generator 308 into the surrounding environment including borehole 116 and formation 204. The highly energetic neutrons 318 entering the surrounding environment interact with atomic nuclei, inducing gamma ray radiation. Induced inelastic and capture gamma rays 320 and thermal neutrons 328 may be sensed and recorded by detection area 304. The scattered neutrons and gamma ray spectrum may be measured to determine properties of borehole 116 and formation 204. Through processing, the measurements may be utilized to identify oil and gas in formation 204 as well as determining the flow in production wells. As illustrated, neutrons 318 may be broadcasted into formation 204, wherein neutrons 318 may interact with material within formation 204 to create inelastic and capture gamma rays 320, discussed in greater detail below. Inelastic and capture gamma rays 320 may be detected, sensed, and/or measured by devices within detection area 304 of pulsed neutron logging tool 132.

Detection area 304 may comprise a number of devices that may be utilized to detect, sense, and/or measure inelastic and capture gamma rays 320. As illustrated, a number of gamma ray scintillator detectors may be utilized, which implement a scintillation crystal coupled to a photomultiplier tube. In examples, gamma ray scintillator detectors may be identified as a near gamma ray scintillator detector 322, a far gamma ray scintillator detector 324, and a long gamma ray scintillator detector 326. Identification of each scintillator detector as near, far, and long is due to the distance from neutron generator 308. For example, the closest scintillator detector to neutron generator 308 is "near," the second closest is "far", and the third closest is "long." This nomenclature may also be utilized for thermal neutron detectors that may also be disposed within detection area 304 and may operate and function to detect thermal neutrons 328 that may originate from formation 204 during the interaction of neutrons 318 with material within formation 204. For example, neutron detectors may operate and function to count thermal (around about 0.025 eV) and/or epithermal (between about 0.1 eV and 100 eV) neutrons. Suitable neutron detectors include Helium-3 (He-3) filled proportional counters, though other neutron counters may also be used. Thus, within detection area 304 may be a near thermal neutron detector 330, a far thermal neutron detector 332, and a long thermal neutron detector 334. As noted above, detection area 304 may be separated from generation area 302 by shielding block 306.

Shielding block 306 may be a structure formed of one or more heavy metals. In examples, shielding block 306 may be Tungsten, Boron, or a combination of Tungsten and Boron. This material may operate and function to prevent neutrons 318 that may be generated from pulsed neutron generator 308 from being detected by the detectors in detection area 304. Without shielding block 306, neutrons 318 generated from pulsed neutron generator 308 may saturate all detectors within detection area 304 and prevent the detection and measurement of gamma rays and neutrons from formation 204.

FIG. 3B illustrates another embodiment of integrated pulsed neutron logging tool 132 in a wireline operation that may allow for neutron porosity measurements together with neutron spectroscopy. In this example, near thermal neutron detector 330, far thermal neutron detector 332, and long thermal neutron detector 334 have been removed but all other parts discussed above in FIG. 3A remain. Additionally, a shielding layer 336 on surface 338 of pulsed neutron logging tool 132 may be disposed over detection area 304. In examples, shielding layer 336 may comprise of Boron or another element that may have a capture cross section and gamma production outside the energy range of interest between 0.7 MeV to 8 MeV. Shielding layer 336 may convert thermal neutrons 328 to 0.48 MeV gamma rays 320 for detection by near gamma ray scintillator detector 322, a far gamma ray scintillator detector 324, and a long gamma ray scintillator detector 326. With the removal of near thermal neutron detector 330, far thermal neutron detector 332, and long thermal neutron detector 334, pulsed neutron logging tool 132 may further be optimized to improve both measurements, and to improve qualities of desired measurements without compromising much for the rest of data sets. For example, the timing of neutron pulses that broadcast neutrons 318 may be altered to eliminate fast neutron contaminations in thermal neutron porosity measurements. Also, shielding layer 336, which placed on surface 338 of pulsed neutron logging tool 132, may increase the phase space for thermal neutron detection (i.e., the detection efficiency) and also reduce the number of thermal neutrons 328 which interact with and may be captured by material that structurally construct pulsed neutron logging tool 132, which otherwise would be a background contribution. This may improve the data quality of thermal neutron capture spectroscopy or Sigma measurements of formation 204. Thus, the implementations discussed above may configure pulsed neutron logging tool 132 with a multi-purpose pulsing scheme to enable multiple types of measurements and gather multiple desired data sets simultaneously, in particular, with simultaneous measurements of spectroscopy and porosity, during one downhole logging trip, in particular for LWD applications.

FIG. 3C illustrates another embodiment of pulsed neutron logging tool 132 in a logging while drilling (LWD) operation that may allow for neutron porosity measurements together with neutron spectroscopy. In the case of LWD applications, a second shielding layer 342 may be disposed to cover detection area 304 in a mud flowing channel 340 inside pulsed neutron logging tool 132. This also eliminates near thermal neutron detector 330, far thermal neutron detector 332, and long thermal neutron detector 334. Consequently, pulsed neutron logging tool 132 may enable simultaneous spectroscopy and neutron porosity measurements of well formation in both Wireline and LWD applications, without introducing near thermal neutron detector 330, far thermal neutron detector 332, and long thermal neutron detector 334 for direct thermal neutron counting. Pulsed neutron logging tool 132 illustrated in FIG. 3C may have all the same components and operations described for FIGS. 3A and 3B.

Figure 4C:
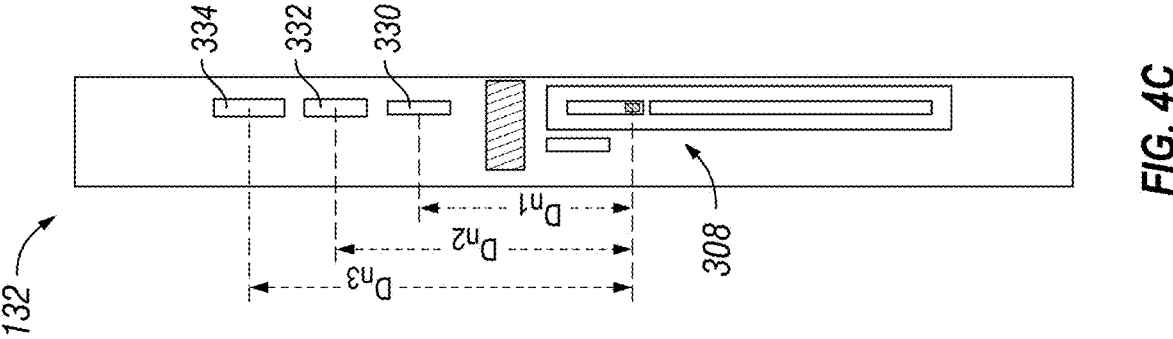
FIG. 4A-4E are diagrams illustrating different distances between parts within the pulsed neutron logging tool.
Figure 4B:
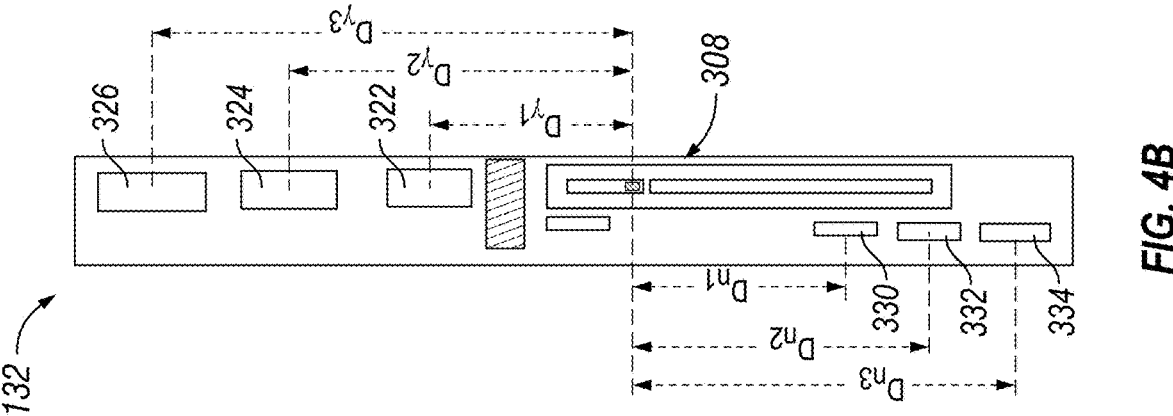
Figure 4A:
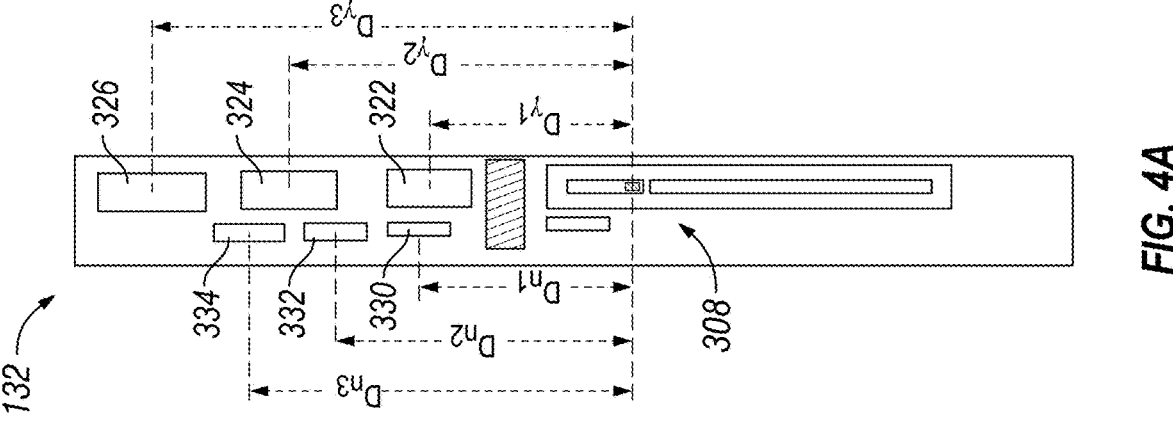
Figure 4E:
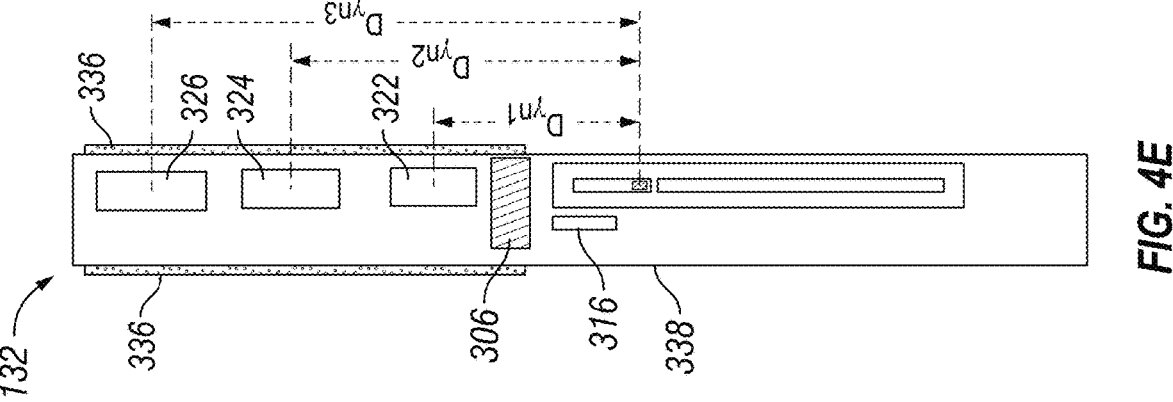
Figure 4D:
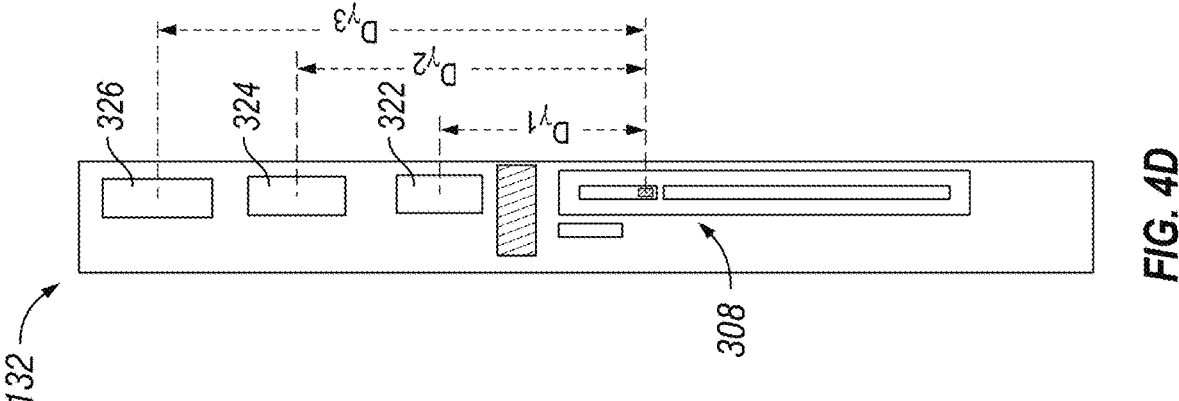

FIGS. 4A-4E illustrate different embodiments of pulsed neutron logging tool 132. FIG. 4A illustrates an embodiment shown in FIG. 3A. In this embodiment, the distance from pulsed neutron generator 308 to near thermal neutron detector 330 is $D_{n1}$, to far thermal neutron detector 332 is $D_{n2}$, and to long thermal neutron detector 334 is $D_{n3}$. Further, the distance from pulsed neutron generator 308 to near gamma ray scintillator detector 322 is $D_{\gamma1}$, a far gamma ray scintillator detector 324 is $D_{\gamma2}$, and a long gamma ray scintillator detector 326 is $D_{\gamma3}$. FIG. 4B illustrates another embodiment in which the distances $D_{n1}$, $D_{n2}$, $D_{n3}$ from pulsed neutron generator 308 to each thermal neutron detector 330, 332, 334 have changed as each thermal neutron detector is now disposed within generation area 302. FIG. 4C illustrates an embodiment where only thermal neutron detectors 330, 332, 334 with distances $D_{n1}$, $D_{n2}$, $D_{n3}$ are utilized and FIG. 4D illustrates an embodiment where only gamma ray scintillator detectors 332, 324, and 326 distances $D_{\gamma1}$, $D_{\gamma2}$, $D_{\gamma3}$ are utilized.

Multiple detectors of pulsed neutron logging tool 132 may enable pulsed neutron logging tool 132 to measure properties of formation 204 and borehole 116 (e.g., referring to FIGS. 3A-3C) using any of the existing multiple-spacing techniques. In addition, the presence of gamma ray detectors which have proper distances from pulsed neutron generator 308, may enable the measurement of elemental gamma ray spectroscopy, with different sensitivities to formation depth.

As discussed above, during measurement operations, fast neutrons 318 (e.g., referring to FIGS. 3A-3C) emitted from neutron source or pulsed neutron generator 308 undergo neutron scattering and/or nuclear absorption when interacting with matter. Scattering may either be elastic (n, n) or inelastic (n, n'). In an elastic interaction a fraction of the neutrons' kinetic energy is transferred to the nucleus. An inelastic interaction is similar, except the nucleus undergoes an internal rearrangement. Additionally, neutrons may also undergo an absorption interaction. During interactions, the elastic cross section is nearly constant, whereas the inelastic scattering cross section and absorption cross sections are proportional to the reciprocal of the neutron speed. For example, inelastic scatterings appear for fast neutrons 318 in the MeV energy range, whereas absorptions happen when neutrons slowed down in the eV energy range.

FIG. 4E illustrates pulsed logging tool 132 with shielding layer 336. As illustrated, shielding layer 336 may be disposed on surface 338 of pulsed logging tool 132, covering detection area 304 for simultaneous neutron porosity and spectroscopy measurements. Shielding layer 336 not only protects the body of pulsed logging neutron tool 132 from thermal neutron interactions to reduce background gamma ray contributions to the spectroscopy measurements, but also captures thermal neutrons and converts them to 0.48 MeV gamma rays for detection in near gamma ray scintillator detector 322, a far gamma ray scintillator detector 324, and a long gamma ray scintillator detector 326. As noted above, distances $D_{\gamma n1}$, $D_{\gamma n2}$ and $D_{\gamma n3}$ may correspond to detect spectroscopy gamma rays induced by neutrons 318 scattered from formation 204 and Boron gamma rays inferenced as thermal neutrons 328 (e.g., referring to FIGS. 3A-3C). By dropping out the direct thermal neutron detectors, pulsed neutron logging tool 132 becomes simpler for engineering, similar to what is illustrated in FIG. 4A for spectroscopy measurements. Additionally, the neutron pulse timing may be automatically utilized to eliminate the influence of fast neutrons 318 on neutron porosity measurements. It should be noted, that in wireline operations, as illustrated in FIGS. 4A-4E, shielding block 306 (such as a Tungsten block), may be utilized to prevent neutrons 318 or gamma rays 320 from flying directly from the pulsed neutron generator 308 to near gamma ray scintillator detector 322, a far gamma ray scintillator detector 324, and a long gamma ray scintillator detector 326 (e.g., referring to FIGS. 3A-3C). In addition, a fast neutron monitor 316 is attached in the vicinity of pulsed neutron generator 308 for monitoring the neutron yield. In the LWD applications, there is a mud-flowing channel 340 (i.e., referring to FIG. 3C) occupying the center region of pulsed logging tool 132 along the tool axis as shown, which may be utilized a second shielding layer 342 to cover detection area 304. The removal or alteration of shielding block 306 may be taken into consideration to allow for LWD operations. During wireline or LWD operations, energetic fast neutrons (14 MeV) emitted from pulsed neutron generator 308 undergo neutron scattering and/or nuclear absorption/capture when interacting with formation matter.

Figure 5:
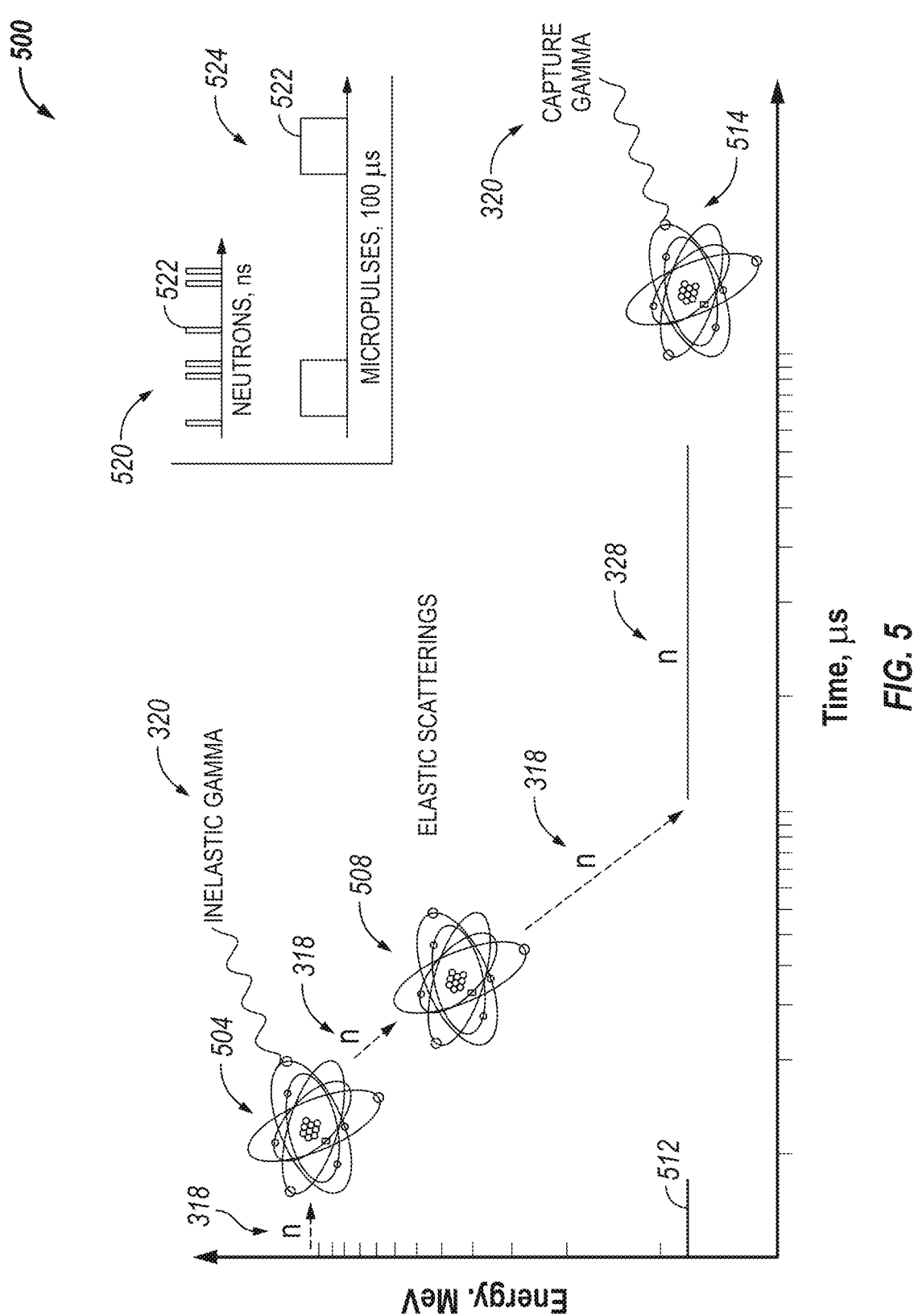
FIG. 5 illustrates the energy of a neutron as it interacts in a time sequence in the present disclosure.

FIG. 5 illustrates a graph 500 that depicts different scattering by a neutron 318. As illustrated, neutron 318 may be traveling at a fast speed with high kinetic energy and interacts with nuclei 504, releasing inelastic gamma ray 320 and lowering the energy state of neutron 318. After the interaction, neutron 318 contains too much energy to be absorbed, thus continuing its path until it interacts with nuclei 508 releasing inelastic gamma ray 320 and again lowering its energy state again. After the interaction, neutron 318 has kinetic energy close to target energy 512, becoming a thermal neutron 328. Thus, when neutron 328 at target energy 512 interacts with nuclei 514 it will be captured. This interaction results in nucleus 514 being rearranged to contain previously traveling neutron 328 and an emitted capture gamma ray 320. Sensing these events with pulsed neutron logging tool 132 using detection area 304 may allow for the identification of oil, gas, and/or water in borehole 116 and formation 204 (e.g., referring to FIGS. 3A-3C).

With continued reference to FIG. 5, the neutron to gamma ray timing information may be utilized during measurement operations in which a pulsing neutron generator is utilized. In a sub-μs time domain, inelastic gamma rays dominate, whereas in a 10-1000 μs time range, there are only capture gamma rays. Insert 520 on FIG. 5 illustrates an example of neutrons in a neutron pulse 522 and insert 524 shows the relationship of two adjacent neutron pulses 522 with a given pulse width and timing interval. Pulsing schemes allow isolation of inelastic and capture gamma rays 320, and then allow elemental determinations of different nuclei in the bore hole, formation, or fluids. For example, this may allow for a clean isolation of Boron gamma rays which may be inferenced as thermal neutron counting for a neutron porosity measurement.

During measurement operations, pulsed neutron logging tool 132 may take any number of measurements of inelastic and capture gamma rays 320 and/or thermal neutrons 328 (e.g., referring to FIGS. 3A-3C). These measurements may be further processed by additional methods and systems that may utilize information handling system 120.

Figure 6:
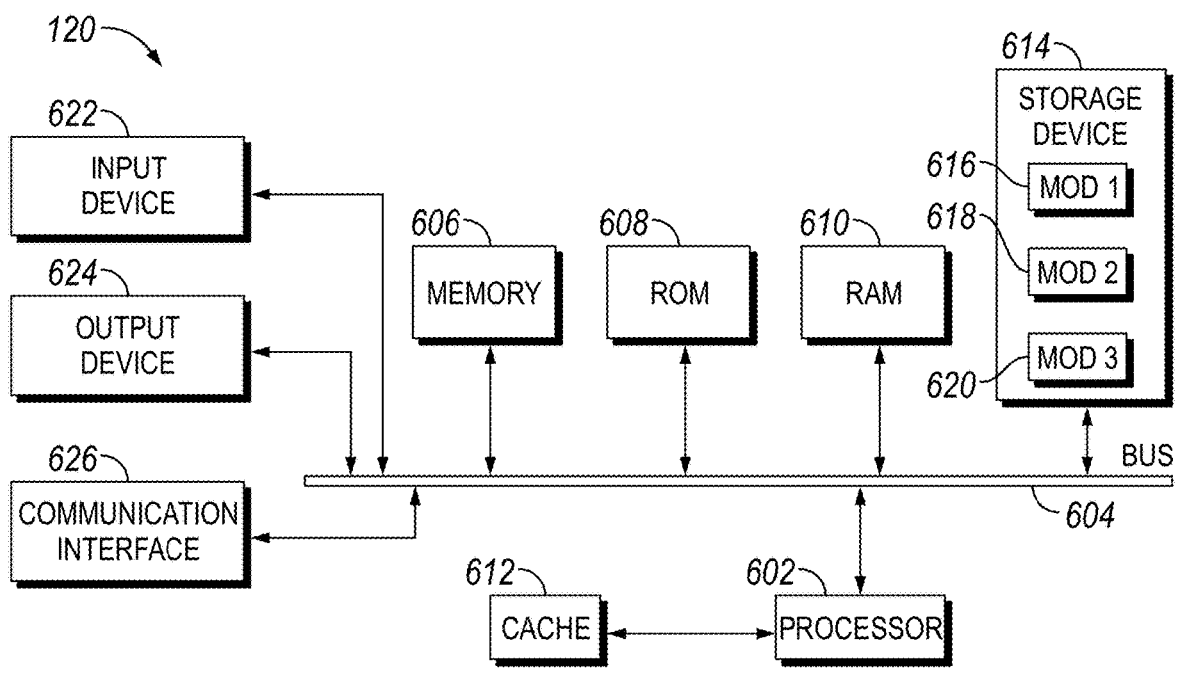
FIG. 6 illustrates a schematic of an information handling system.

FIG. 6 further illustrates an example information handling system 120 which may be employed to perform various steps, methods, and techniques disclosed herein. Persons of ordinary skill in the art will readily appreciate that other system examples are possible. As illustrated, information handling system 120 includes a processing unit (CPU or processor) 602 and a system bus 604 that couples various system components including system memory 606 such as read only memory (ROM) 608 and random-access memory (RAM) 610 to processor 602. Processors disclosed herein may all be forms of this processor 602. Information handling system 120 may include a cache 612 of high-speed memory connected directly with, in close proximity to, or integrated as part of processor 602. Information handling system 120 copies data from memory 606 and/or storage device 614 to cache 612 for quick access by processor 602. In this way, cache 612 provides a performance boost that avoids processor 602 delays while waiting for data. These and other modules may control or be configured to control processor 602 to perform various operations or actions. Other system memory 606 may be available for use as well. Memory 606 may include multiple different types of memory with different performance characteristics. It may be appreciated that the disclosure may operate on information handling system 120 with more than one processor 602 or on a group or cluster of computing devices networked together to provide greater processing capability. Processor 602 may include any general-purpose processor and a hardware module or software module, such as first module 616, second module 618, and third module 620 stored in storage device 614, configured to control processor 602 as well as a special-purpose processor where software instructions are incorporated into processor 602. Processor 602 may be a self-contained computing system, containing multiple cores or processors, a bus, memory controller, cache, etc. A multi-core processor may be symmetric or asymmetric. Processor 602 may include multiple processors, such as a system having multiple, physically separate processors in different sockets, or a system having multiple processor cores on a single physical chip. Similarly, processor 602 may include multiple distributed processors located in multiple separate computing devices but working together such as via a communications network. Multiple processors or processor cores may share resources such as memory 606 or cache 612 or may operate using independent resources. Processor 602 may include one or more state machines, an application specific integrated circuit (ASIC), or a programmable gate array (PGA) including a field PGA (FPGA).

Each individual component discussed above may be coupled to system bus 604, which may connect each and every individual component to each other. System bus 604 may be any of several types of bus structures including a memory bus or memory controller, a peripheral bus, and a local bus using any of a variety of bus architectures. A basic input/output (BIOS) stored in ROM 608 or the like, may provide the basic routine that helps to transfer information between elements within information handling system 120, such as during start-up. Information handling system 120 further includes storage devices 614 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 614 may include software modules 616, 618, and 620 for controlling processor 602. Information handling system 120 may include other hardware or software modules. Storage device 614 is connected to the system bus 604 by a drive interface. The drives and the associated computer-readable storage devices provide nonvolatile storage of computer-readable instructions, data structures, program modules and other data for information handling system 120. In one aspect, a hardware module that performs a particular function includes the software component stored in a tangible computer-readable storage device in connection with hardware components, such as processor 602, system bus 604, and so forth, to carry out a particular function. In another aspect, the system may use a processor and computer-readable storage device to store instructions which, when executed by the processor, cause the processor to perform operations, a method or other specific actions. The basic components and appropriate variations may be modified depending on the type of device, such as whether information handling system 120 is a small, handheld computing device, a desktop computer, or a computer server. When processor 602 executes instructions to perform "operations", processor 602 may perform the operations directly and/or facilitate, direct, or cooperate with another device or component to perform the operations.

As illustrated, information handling system 120 employs storage device 614, which may be a hard disk or other types of computer-readable storage devices which may store data that are accessible by a computer, such as magnetic cassettes, flash memory cards, digital versatile disks (DVDs), cartridges, random access memories (RAMs) 610, read only memory (ROM) 608, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per sc.

To enable user interaction with information handling system 120, an input device 622 represents any number of input mechanisms, such as a microphone for speech, a touch-sensitive screen for gesture or graphical input, keyboard, mouse, motion input, speech and so forth. Additionally, input device 622 may receive one or more measurements from bottom-hole assembly 118 (e.g., referring to FIG. 1), discussed above. An output device 624 may also be one or more of a number of output mechanisms known to those of skill in the art. In some instances, multimodal systems enable a user to provide multiple types of input to communicate with information handling system 120. Communications interface 626 generally governs and manages the user input and system output. There is no restriction on operating on any particular hardware arrangement and therefore the basic hardware depicted may easily be substituted for improved hardware or firmware arrangements as they are developed.

As illustrated, each individual component described above is depicted and disclosed as individual functional blocks. The functions these blocks represent may be provided through the use of either shared or dedicated hardware, including, but not limited to, hardware capable of executing software and hardware, such as a processor 602, that is purpose-built to operate as an equivalent to software executing on a general-purpose processor. For example, the functions of one or more processors presented in FIG. 6 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 608 for storing software performing the operations described below, and random-access memory (RAM) 610 for storing results. Very large-scale integration (VLSI) hardware embodiments, as well as custom VLSI circuitry in combination with a general-purpose DSP circuit, may also be provided.

Figure 7:
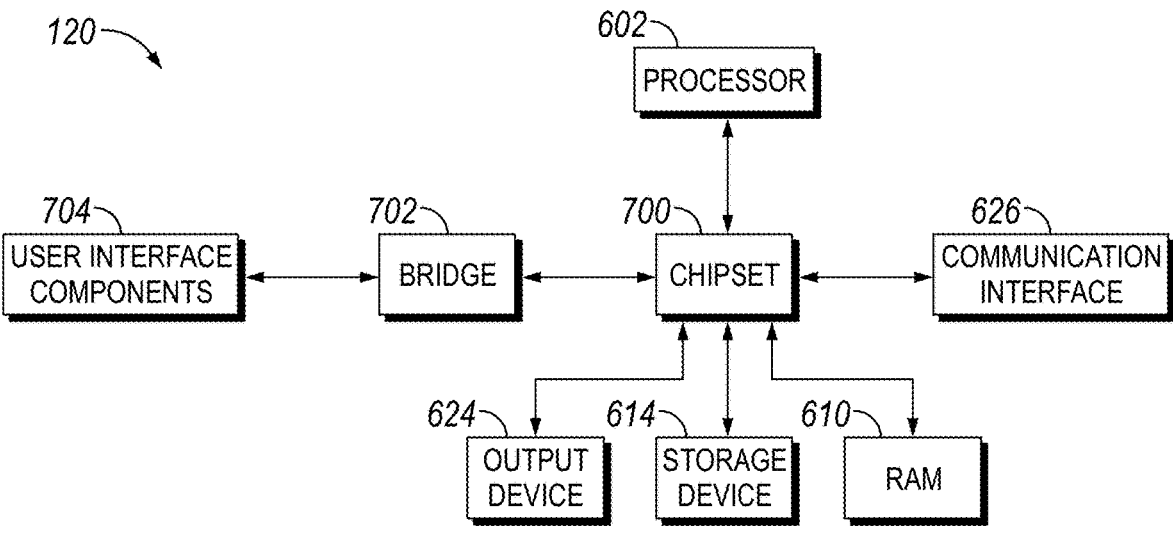
FIG. 7 illustrates a schematic of a chip set.

FIG. 7 illustrates an example information handling system 120 having a chipset architecture that may be used in executing the described method and generating and displaying a graphical user interface (GUI). Information handling system 120 is an example of computer hardware, software, and firmware that may be used to implement the disclosed technology. Information handling system 120 may include a processor 602, representative of any number of physically and/or logically distinct resources capable of executing software, firmware, and hardware configured to perform identified computations. Processor 602 may communicate with a chipset 700 that may control input to and output from processor 602. In this example, chipset 700 outputs information to output device 624, such as a display, and may read and write information to storage device 614, which may include, for example, magnetic media, and solid-state media. Chipset 700 may also read data from and write data to RAM 610. A bridge 702 for interfacing with a variety of user interface components 704 may be provided for interfacing with chipset 700. Such user interface components 704 may include a keyboard, a microphone, touch detection and processing circuitry, a pointing device, such as a mouse, and so on. In general, inputs to information handling system 120 may come from any of a variety of sources, machine generated and/or human generated.

Chipset 700 may also interface with one or more communication interfaces 626 that may have different physical interfaces. Such communication interfaces may include interfaces for wired and wireless local area networks, for broadband wireless networks, as well as personal arca networks. Some applications of the methods for generating, displaying, and using the GUI disclosed herein may include receiving ordered datasets over the physical interface or be generated by the machine itself by processor 602 analyzing data stored in storage device 614 or RAM 610. Further, information handling system 120 receives inputs from a user via user interface components 704 and executes appropriate functions, such as browsing functions by interpreting these inputs using processor 602.

In examples, information handling system 120 may also include tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

Figure 8:
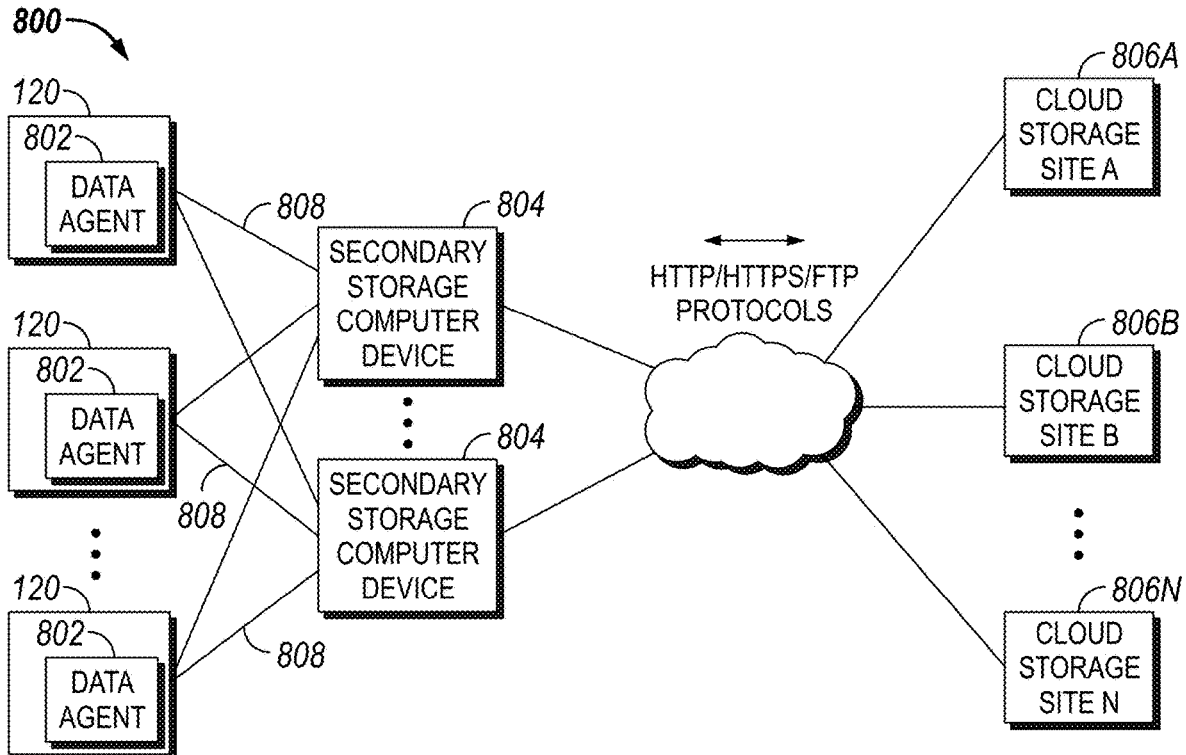
FIG. 8 illustrates a computing network.

FIG. 8 illustrates an example of one arrangement of resources in a computing network 800 that may employ the processes and techniques described herein, although many others are of course possible. As noted above, an information handling system 120, as part of their function, may utilize data, which includes files, directories, metadata (e.g., access control list (ACLS) creation/edit dates associated with the data, etc.), and other data objects. The data on the information handling system 120 is typically a primary copy (e.g., a production copy). During a copy, backup, archive or other storage operation, information handling system 120 may send a copy of some data objects (or some components thereof) to a secondary storage computing device 804 by utilizing one or more data agents 802.

A data agent 802 may be a desktop application, website application, or any software-based application that is run on information handling system 120. As illustrated, information handling system 120 may be disposed at any rig site (e.g., referring to FIG. 1), off site location, or repair and manufacturing center. The data agent may communicate with a secondary storage computing device 804 using communication protocol 808 in a wired or wireless system. Communication protocol 808 may function and operate as an input to a website application. In the website application, field data related to pre- and post-operations, generated DTCs, notes, and the like may be uploaded. Additionally, information handling system 120 may utilize communication protocol 808 to access processed measurements, operations with similar DTCs, troubleshooting findings, historical run data, and/or the like. This information is accessed from secondary storage computing device 804 by data agent 802, which is loaded on information handling system 120.

Secondary storage computing device 804 may operate and function to create secondary copies of primary data objects (or some components thereof) in various cloud storage sites 806A-N. Additionally, secondary storage computing device 804 may run determinative algorithms on data uploaded from one or more information handling systems 120, discussed further below. Communications between the secondary storage computing devices 804 and cloud storage sites 806A-N may utilize REST protocols (Representational state transfer interfaces) that satisfy basic C/R/U/D semantics (Create/Read/Update/Delete semantics), or other hypertext transfer protocol ("HTTP")-based or file-transfer protocol ("FTP")-based protocols (e.g., Simple Object Access Protocol).

In conjunction with creating secondary copies in cloud storage sites 806A-N, the secondary storage computing device 804 may also perform local content indexing and/or local object-level, sub-object-level or block-level deduplication when performing storage operations involving various cloud storage sites 806A-N. Cloud storage sites 806A-N may further record and maintain, EM logs, map DTC codes, store repair and maintenance data, store operational data, and/or provide outputs from determinative algorithms that are located in cloud storage sites 806A-N. In a non-limiting example, this type of network may be utilized as a platform to store, backup, analyze, import, preform extract, transform and load ("ETL") processes, mathematically process, apply machine learning models, and augment EM measurement data sets.

A machine learning model may be an empirically derived model which may result from a machine learning algorithm identifying one or more underlying relationships within a dataset. In comparison to a physics-based model, such as Maxwell's Equations, which are derived from first principles and define the mathematical relationship of a system, a pure machine learning model may not be derived from first principles. Once a machine learning model is developed, it may be queried in order to predict one or more outcomes for a given set of inputs. The type of input data used to query the model to create the prediction may correlate both in category and type to the dataset from which the model was developed.

The structure of, and the data contained within a dataset provided to a machine learning algorithm may vary depending on the intended function of the resulting machine learning model. The rows of data, or data points, within a dataset may contain one or more independent values. Additionally, datasets may contain corresponding dependent values. The independent values of a dataset may be referred to as "features," and a collection of features may be referred to as a "feature space." If dependent values are available in a dataset, they may be referred to as outcomes or "target values." Although dependent values may be a component of a dataset for certain algorithms, not all algorithms require a dataset with dependent values. Furthermore, both the independent and dependent values of the dataset may comprise either numerical or categorical values.

While it may be true that machine learning model development is more successful with a larger dataset, it may also be the case that the whole dataset isn't used to train the model. A test dataset may be a portion of the original dataset which is not presented to the algorithm for model training purposes. Instead, the test dataset may be used for what may be known as "model validation," which may be a mathematical evaluation of how successfully a machine learning algorithm has learned and incorporated the underlying relationships within the original dataset into a machine learning model. This may include evaluating model performance according to whether the model is over-fit or under-fit. As it may be assumed that all datasets contain some level of error, it may be important to evaluate and optimize the model performance and associated model fit by a model validation. In general, the variability in model fit (e.g.: whether a model is over-fit or under-fit) may be described by the "bias-variance trade-off." As an example, a model with high bias may be an under-fit model, where the developed model is over-simplified, and has either not fully learned the relationships within the dataset or has over-generalized the underlying relationships. A model with high variance may be an over-fit model which has overlearned about non-generalizable relationships within training dataset which may not be present in the test dataset. In a non-limiting example, these non-generalizable relationships may be driven by factors such as intrinsic error, data heterogeneity, and the presence of outliers within the dataset. The selected ratio of training data to test data may vary based on multiple factors, including, in a non-limiting example, the homogeneity of the dataset, the size of the dataset, the type of algorithm used, and the objective of the model. The ratio of training data to test data may also be determined by the validation method used, wherein some non-limiting examples of validation methods include k-fold cross-validation, stratified k-fold cross-validation, bootstrapping, leave-one-out cross-validation, resubstituting, random sub-sampling, and percentage hold-out.

In addition to the parameters that exist within the dataset, such as the independent and dependent variables, machine learning algorithms may also utilize parameters referred to as "hyperparameters." Each algorithm may have an intrinsic set of hyperparameters which guide what and how an algorithm learns about the training dataset by providing limitations or operational boundaries to the underlying mathematical workflows on which the algorithm functions. Furthermore, hyperparameters may be classified as either model hyperparameters or algorithm parameters.

Model hyperparameters may guide the level of nuance with which an algorithm learns about a training dataset, and as such model hyperparameters may also impact the performance or accuracy of the model that is ultimately generated. Modifying or tuning the model hyperparameters of an algorithm may result in the generation of substantially different models for a given training dataset. In some cases, the model hyperparameters selected for the algorithm may result in the development of an over-fit or under-fit model. As such, the level to which an algorithm may learn the underlying relationships within a dataset, including the intrinsic error, may be controlled to an extent by tuning the model hyperparameters.

Model hyperparameter selection may be optimized by identifying a set of hyperparameters which minimize a predefined loss function. An example of a loss function for a supervised regression algorithm may include the model error, wherein the optimal set of hyperparameters correlates to a model which produces the lowest difference between the predictions developed by the produced model and the dependent values in the dataset. In addition to model hyperparameters, algorithm hyperparameters may also control the learning process of an algorithm, however algorithm hyperparameters may not influence the model performance. Algorithm hyperparameters may be used to control the speed and quality of the machine learning process. As such, algorithm hyperparameters may affect the computational intensity associated with developing a model from a specific dataset.

Machine learning algorithms, which may be capable of capturing the underlying relationships within a dataset, may be broken into different categories. One such category may include whether the machine learning algorithm functions using supervised, unsupervised, semi-supervised, or reinforcement learning. The objective of a supervised learning algorithm may be to determine one or more dependent variables based on their relationship to one or more independent variables. Supervised learning algorithms are named as such because the dataset includes both independent and corresponding dependent values where the dependent value may be thought of as "the answer," that the model is seeking to predict from the underlying relationships in the dataset. As such, the objective of a model developed from a supervised learning algorithm may be to predict the outcome of one or more scenarios which do not yet have a known outcome. Supervised learning algorithms may be further divided according to their function as classification and regression algorithms. When the dependent variable is a label or a categorical value, the algorithm may be referred to as a classification algorithm. When the dependent variable is a continuous numerical value, the algorithm may be a regression algorithm. In a non-limiting example, algorithms utilized for supervised learning may include Neural Networks, K-Nearest Neighbors, Naïve Bayes, Decision Trees, Classification Trees, Regression Trees, Random Forests, Linear Regression, Support Vector Machines (SVM), Gradient Boosting Regression, and Perception Back-Propagation.

The objective of unsupervised machine learning may be to identify similarities and/or differences between the data points within the dataset which may allow the dataset to be divided into groups or clusters without the benefit of knowing which group or cluster the data may belong to. Datasets utilized in unsupervised learning may not include a dependent variable as the intended function of this type of algorithm is to identify one or more groupings or clusters within a dataset. In a non-limiting example, algorithms which may be utilized for unsupervised machine learning may include K-means clustering, K-means classification, Fuzzy C-Means, Gaussian Mixture, Hidden Markov Model, Neural Networks, and Hierarchical algorithms.

Figure 9:
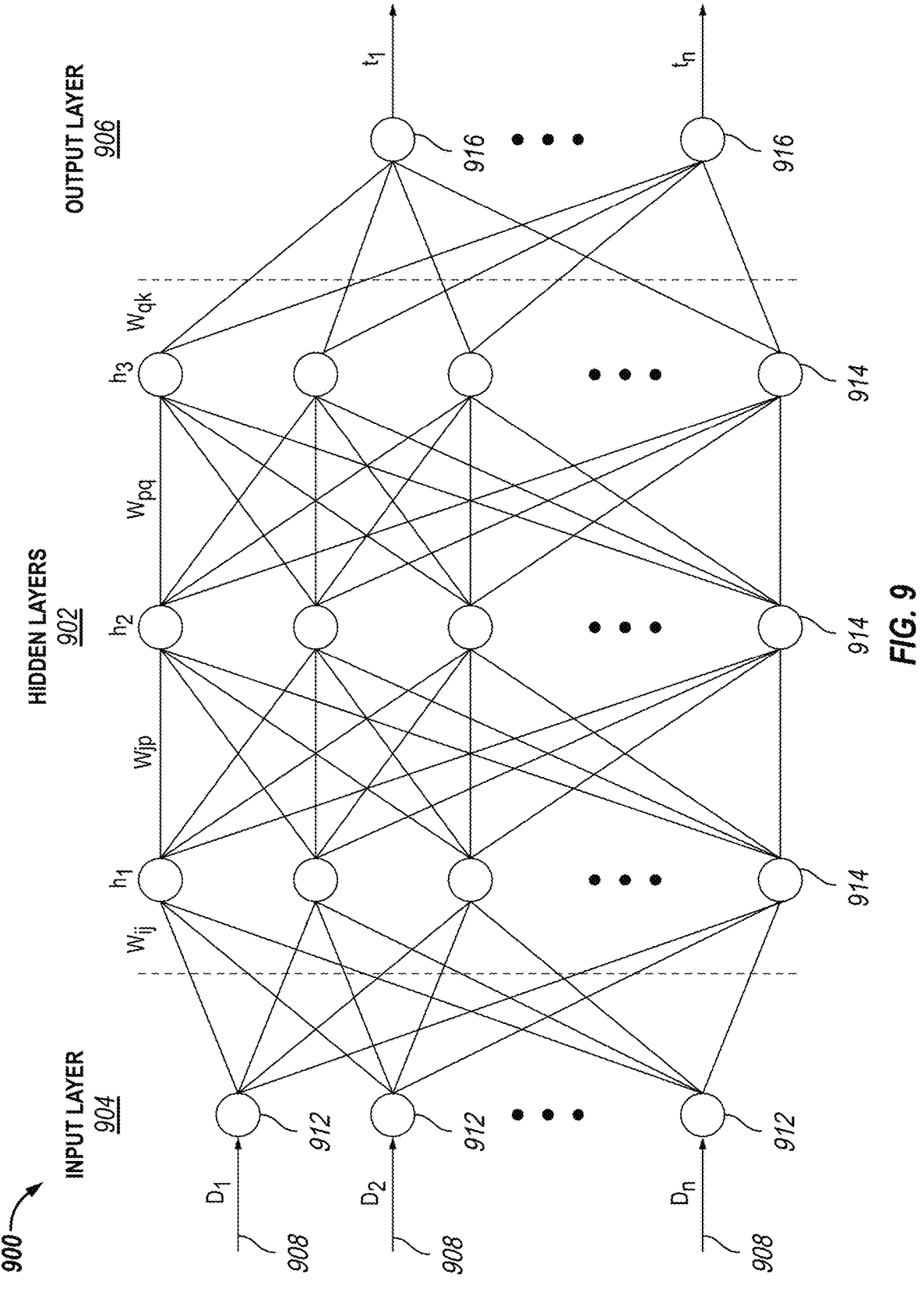
FIG. 9 illustrates a neural network.

In examples to determine a relationship using machine learning, a neural network (NN) 900, as illustrated in FIG. 9, may be utilized to model a three-dimensional finite element BHA to analyze lateral deflection experienced by BHA 118 (e.g., referring to FIG. 1) in both its lateral deflection in both inclination and pseudo-azimuth planes in a curved borehole 116 (e.g., referring to FIG. 1). FIG. 9 illustrates neural network (NN) 900. NN 900 may operate utilizing one or more information handling systems 120 (e.g., referring to FIG. 1) on computing network 800. Although a NN is illustrated, multiple models may be used with input output structures. These models may include flexible empirical models such as NN, gaussian processing methods, kriging methods, evolutionary methods such as genetic algorithms, classification methods, clustering methods empirical methods, or physics-based methods such as equations of state, thermodynamic models, geological, geochemistry, or chemistry models, or kinetic models or any combinations therein including recursive combinations of similar or dissimilar models and iterative model combinations. A NN 900 is an artificial neural network with one or more hidden layers 902 between input layer 904 and output layer 906. In examples, NN 900 may be software on a single information handling system 120. In other examples, NN 900 may software running on multiple information handling systems 120 connected wirelessly and/or by a hard-wired connection in a network of multiple information handling systems 120. Herein, NN 900 may be applied in a wide array of implementations.

During operations, inputs 908 data are given to neurons 912 in input layer 904. Neurons 912, 914, and 916 are defined as individual or multiple information handling systems 120 connected in a computing network 800. The output from neurons 912 may be transferred to one or more neurons 914 within one or more hidden layers 902. Hidden layers 902 includes one or more neurons 914 connected in a network that further process information from neurons 912. The number of hidden layers 902 and neurons 912 in hidden layer 902 may be determined by personnel that designs NN 900. Hidden layers 902 is defined as a set of information handling system 120 assigned to specific processing. Hidden layers 902 spread computation to multiple neurons 912, which may allow for faster computing, processing, training, and learning by NN 900. Output from NN 900 may be computed by neurons 916. An information handling system 120 (e.g., referring to FIG. 1) being utilized in a computing network 800, NN 900, or alone may control measurement operations downhole with pulsed neutron logging tool 132.

Specifically, information regarding a neutron to gamma ray timing may be computed and utilized by information handling system 120 during measurement operations in which pulsed neutron generator 308 (e.g., referring to FIGS. 3A-3C) is pulsed. In a sub-μs time domain, fast neutrons and inelastic gamma rays 320 dominate, whereas in a 10-1000 μs time range, thermal neutrons 328 are bouncing around and capture gamma rays are detected.

Figure 10:
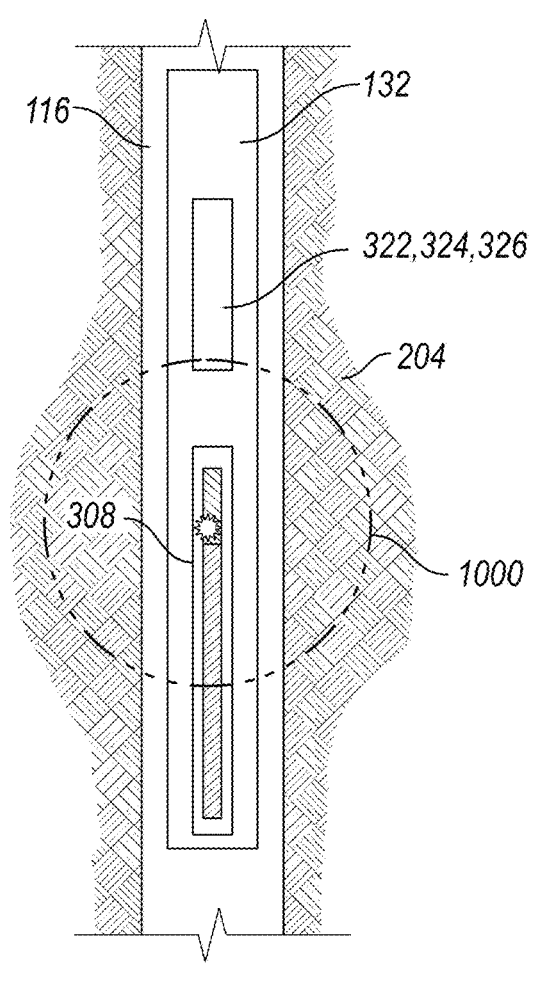
FIG. 10 illustrates a thermal neutron cloud within a wireline or a logging while drilling operation.

In addition, thermal neutrons 328 may take a long time (up to or more than 1000 μs) to be captured due to low material capture cross-sections and may continuously bounce around. This is illustrated in FIG. 10, which depicts a pulsed neutron logging tool 132 within borehole 116 during a measurement operation. Thermal neutrons 328 are distributed with their population density as a function of distance from the target of pulsed neutron generator 308, and as a function of time, around pulsed neutron logging tool 132, borehole 116, and formation 204. Thermal neutrons 328 may behave as a thermal neutron "cloud" 1000 surrounding pulsed neutron tool 132. Within detection arca 304 near thermal neutron detector 330, far thermal neutron detector 332, and long thermal neutron detector 334 may be sensing the interaction of thermal neutrons 328 within thermal neutron cloud 1000 with the nuclei of formation 204. Alternatively, within detection area 304 near scintillator gamma ray detector 322, far scintillator gamma detector 324, long scintillator gamma ray detector 326 may be sensing the inelastic and capture gamma rays from the interactions of fast neutrons 318 and thermal neutrons 328 within the thermal neutron cloud 1000 with the nuclei of formation 204. Thus, pulsing schemes allow isolation of inelastic gamma rays 320 (e.g., referring to FIGS. 3A-3C) and capture gamma rays 320, and/or thermal neutrons 328. Pulsing schemes may further allow for measurements of neutron porosity, and elemental determinations of different nuclei in borehole 116, formation 204, or fluids within formation 204. Methods and systems discussed below may allow for identifying the best pulsing scheme for pulsed neutron logging tool 132 during measurement operations. This may allow for a plurality of measurements to be taken simultaneously during a single logging trip, allow the manipulation of thermal neutron cloud 1000, and the optimization of measurements to acquire high quality required data.

With continued reference to FIG. 10 and FIGS. 3A-3C, the implementation of a shielding layer 336 on surface 338 of pulsed neutron logging tool 132 covering detection arca 304 may allow for simultaneous neutron porosity and spectroscopy measurements near scintillator gamma ray detector 322, far scintillator gamma detector 324, and long scintillator gamma ray detector 326 as described above. As noted above, shielding layer 336 captures thermal neutrons in borehole 116 before they enter neutron logging tool 132 to convert the thermal neutrons to 0.48 MeV gamma rays. Then near scintillator gamma ray detector 322, far scintillator gamma detector 324, and long scintillator gamma ray detector 326, during the OFF state of pulsing scheme as shown in FIG. 11 below, detect these 0.48 MeV gamma rays inferenced as thermal neutrons for neutron porosity measurements.

Figure 11:
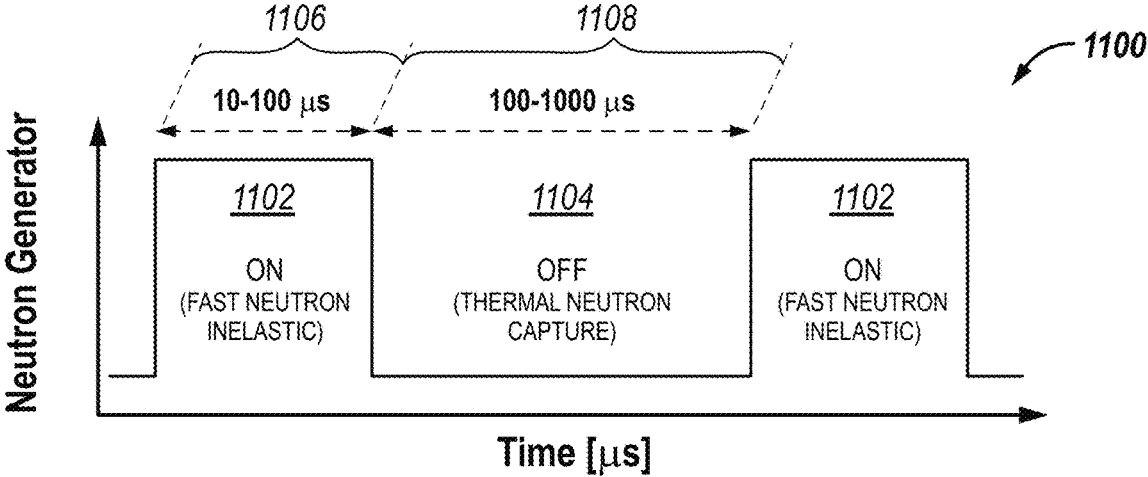
FIG. 11 is a graph showing an ON pulsing state and an OFF pulsing state.

FIG. 11 illustrates a rudimentary pulsing scheme 1100, showing a neutron generator 308 (e.g., referring to FIGS. 3A-3C) is operated with an ON-pulsing state 1102 and an OFF-pulsing state 1104 with a given pulse width 1106 and timing interval 1108, for fast neutron inelastic and thermal neutron capture measurements. A minimum pulse width or directly the operating duty factor (percentage of the "ON"

time during a pulsing cycle), may be utilized for operating neutron generator 308 to produce a sufficient high flux of fast neutrons 318, to allow not only the fast neutron inelastic gamma ray measurements, but also with enough number of thermal neutrons 328 bouncing around to enable the thermal neutron measurements and capture gamma ray measurements during the "OFF" time.

In wireline applications, as illustrated in FIG. 2, pulsed neutron logging tools 132 have been developed, and many versions of pulsing schemes 1100 have been deployed for various measurements with emphasis on special purposes, potentially through multiple logging trips with alternate pulsing schemes. In LWD applications, as illustrated in FIG. 1, multiple logging trips are not practical. Thus, a universal pulsing scheme may be utilized and optimized for multi-purpose measurements and for acquiring high quality required data, not only for boosting the wireline logging efficiency but also for enabling the LWD applications.

Figure 12:
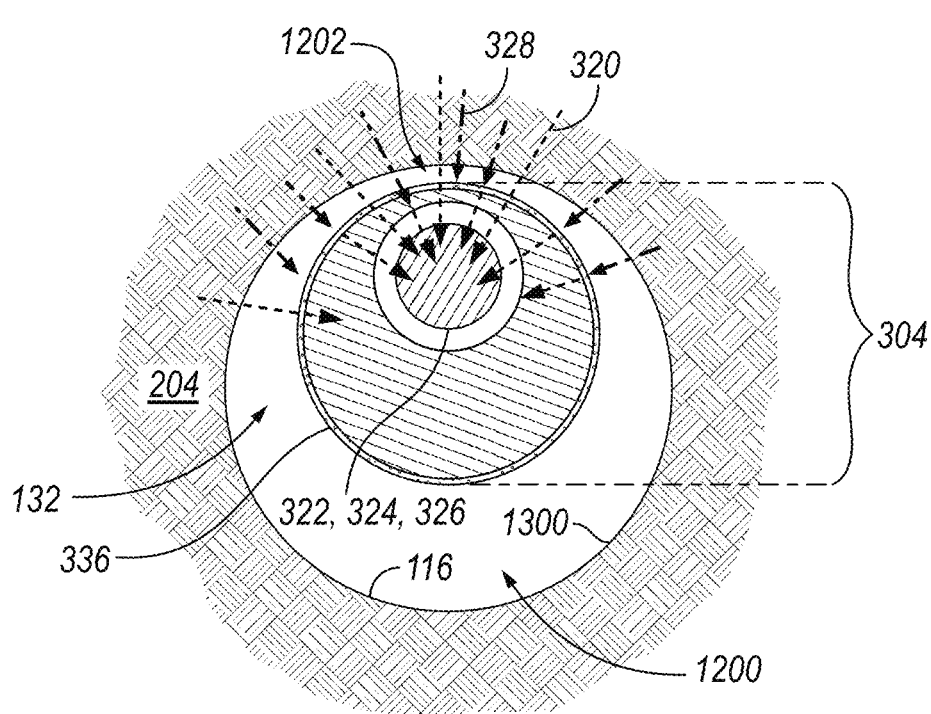
FIG. 12 illustrates a top down view the pulsed logging tool in a wireline operation.

FIG. 12 illustrates a top-down view of a cross section of pulse neutron logging tool 132. As illustrated, a scintillator detector (i.e., near scintillator gamma ray detector 322, far scintillator gamma detector 324, and long scintillator gamma ray detector 326) disposed in pulse neutron logging tool 132, in which shielding layer 336 is disposed on the outer surface of pulse neutron logging tool 132 at detection area 304, that is disposed eccentrically for measuring formation 204 in a measurement operation. During operations, gamma rays 320 from the neutron inelastic scattering and capture reactions in formation 204, which come to borehole 116, may enter detection area 304 of pulsed neutron logging tool 132. These gamma rays may hit any of the scintillator detectors 322, 324, 326, which in turn will detect the gamma rays 320. At the same time, thermal neutrons 328 in thermal neutron cloud 1000 (e.g., referring to FIG. 10) distributed in formation 204 may also enter borehole 116. A number of thermal neutrons 328 may be captured by shielding layer 336 which covers detection area 304, as disclosed above. Shielding layer 336 may convert thermal neutrons 328 into Boron gamma rays 320 (0.48 MeV), which may be detected by any scintillator detectors 322, 324, 326.

Figure 13:
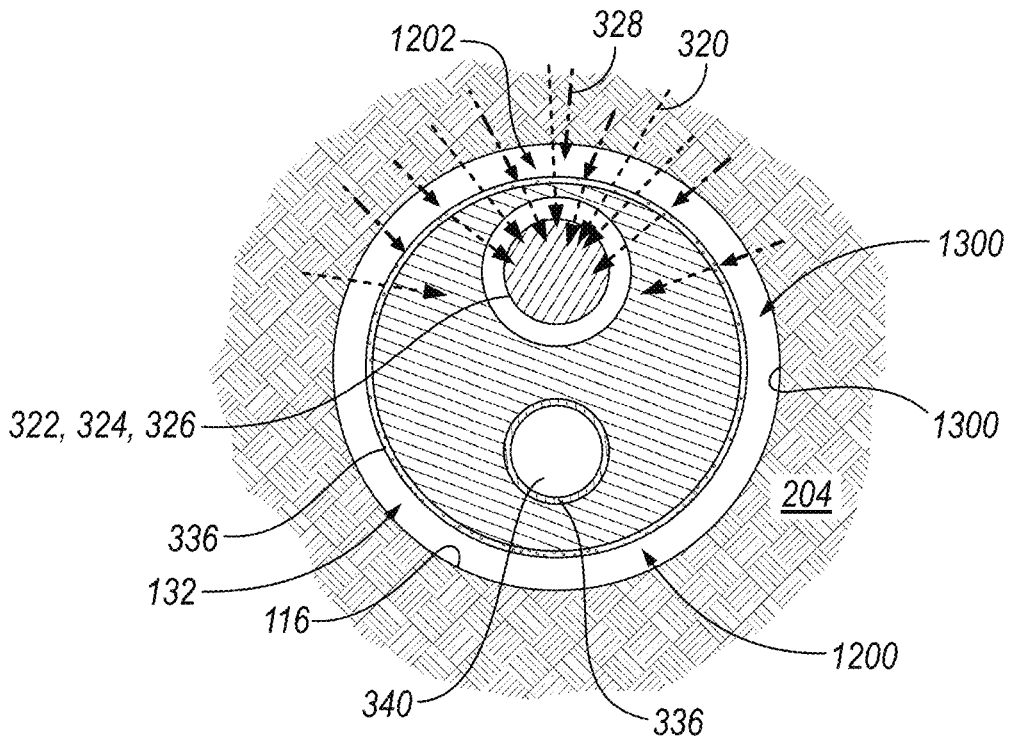
FIG. 13 illustrates a top down view the pulsed logging tool in a logging while drilling operation.

The use of shielding layer 336 may allow for detection of thermal neutrons 328. Specifically, thermal neutron detection efficiency is increased over conventional methods of thermal neutron detection, such as (i.e., near scintillator gamma ray detector 322, far scintillator gamma detector 324, and long scintillator gamma ray detector 326). Additionally, shielding layer 336 may be disposed on surface 338 of pulsed neutron logging tool 132, allowing shielding layer 336 to be disposed between pulsed neutron logging tool 132 and wall 1300 of borehole 116. This may allow for thermal neutrons 328 inside borehole 116 to be absorbed before entering pulsed neutron logging tool 132. Thus, the borehole fluidic effects on thermal neutron porosity measurements may be minimized. It should be noted that gamma rays 320 from back side 1200 of pulsed neutron logging tool, especially the Boron gamma rays 320 due to its low energy of 0.48 MeV, may be shielded by materials in pulsed neutron logging tool 132 to prevent boron gamma rays 320 from contributing to the neutron porosity measurements. As illustrated in FIGS. 12 and 13, near scintillator gamma ray detector 322, far scintillator gamma detector 324, and long scintillator gamma ray detector 326 are shifted within pulsed neutron logging tool 132 toward at least a part of surface 338 of pulsed neutron logging tool 132. Thus, near scintillator gamma ray detector 322, far scintillator gamma detector 324, and long scintillator gamma ray detector 326 are off centered. In this arrangement, front side 1202 is defined as at least parts of surface 338 in which near scintillator gamma ray detector 322, far scintillator gamma detector 324, and long scintillator gamma ray detector 326 are shifted toward. Thus, back side 1200 is defined as at least parts of surface 338 in which near scintillator gamma ray detector 322, far scintillator gamma detector 324, and long scintillator gamma ray detector 326 are shifted away from. This further minimizes the borehole fluidic effects from back side 1200 of pulsed neutron logging tool 132 where a large volume of borehole fluid is available due to such an eccentrical place-ment of pulsed neutron logging tool in borehole 116, as may be performed during measurement operations. In contrast, borehole fluidic effects may be unavoidable in a conven-tional neutron porosity tool with direct thermal neutron detection.

FIG. 13 illustrates a top-down view of a cross section of pulse neutron logging tool 132 in a LWD measurement operation. As illustrated a scintillator detector (i.e., near scintillator gamma ray detector 322, far scintillator gamma detector 324, and long scintillator gamma ray detector 326) disposed in pulse neutron logging tool 132, in which shield-ing layer 336 is disposed on the outer surface of pulse neutron logging tool 132 at detection area 304, that is disposed eccentrically for measuring formation 204 in a measurement operation. Further, a mud flow channel 340 for LWD operations is disposed within pulsed neutron logging tool 132. As discussed above, a second shielding layer 342 may be disposed on the surface of mud flow channel 340.

As discussed above, thermal neutrons 328 in thermal neutron cloud 1000 (e.g., referring to FIG. 10) distributed in formation 204 may be converted by shielding layer 336 and second shielding layer 342. Thermal neutrons 328 may be detected by any scintillator detector together with gamma rays 320. As noted above, thermal neutron detection effi-ciency may increase as Shielding layer 336 and second shielding layer 342 may cover a large surface area of drilling collar. It should be noted that pulse neutron logging tool 132 is disposed inside the drilling collar as are all LWD logging tools. The section of drilling collar that houses pulse neutron logging tool 132 may at least in part have a boron coating. At the same time, drilling collar with massive body materials may further shield scintillator detectors on back side 1200, which may make the measurements azimuthally sensitive to front side 1202 of any of the scintillator detectors.

Also as shown in both FIGS. 12 and 13, thermal neutrons 328 may be absorbed by shielding layer 336, preventing thermal neutrons 328 from entering the body of pulsed neutron logging tool 132. Thus, pulsed neutron logging tool 132 may not contribute a plurality of neutron captured gamma rays 320, which otherwise may be backgrounds to the spectroscopy measurements. Specifically, by implement-ing a shielding layer 336, spectroscopy measurements may have reduced background noise measurements from gamma rays 320. With continued reference to FIGS. 12 and 13, shielding layer 336 may comprise $^{10}$B. Generally, $^{10}$B may have a large thermal neutron absorption cross-section. In examples, about 6% thermal neutrons are captured per 1 μm $^{10}$B. That is, the neutron reduction is about 6% per 1 μm $^{10}$B. And the reduction would increase by the coating thickness of a single layer, and/or by the number of multiple layers, or precisely by the power law of 0.94", with n being the total thickness in unit of μm.

Thus, a thickness of 20 μm $^{10}$B may give a 70% reduction. For a total blackness of thermal neutrons 328, shielding layer 336 may have a thickness of 100 μm to achieve more than two orders of magnitude reduction. For this disclosure, total blackness is defined as more than 2 orders of magnitude of reduction in thermal neutron flux. In examples, with a $^{10}$B$_4$C coating the thickness may need to be scaled up by 80% reduction of $^{10}$B. Furthermore, if natural Boron is used, then the thickness may need to be scaled up by a factor of 5 due to its 20% $^{10}$B abundance. Thus, a 200 μm thickness of $^{10}$B or equivalent may be sufficed to capture nearly 100% of thermal neutrons 328, of which 94% would release "prompt" gamma rays 320 with an energy of 0.48 MeV. Depending on the detector sizes (i.e., near gamma ray scintillator detector 322, far gamma ray scintillator detector 324, and long gamma ray scintillator detector 326 (e.g., referring to FIGS. 3A-3C)) and positioning, about third of thermal neutrons 328 may be detected. As seen below, Table 1 is an estimate of thermal neutron transparencies in per-centages as function of thickness of shielding layer 336. Detailed thickness of a $^{10}$B layer, and its effectiveness of absorbing thermal neutrons may be modeled by Monte Carlo N-Particle (MCNP) in either a Wireline or LWD tool con-figuration.

TABLE 1

| $^{10}$B thickness (μm) | $^{10}$B$_4$C thickness (μm) | Natural Boron thickness (μm) | Thermal neutron transparency (%) |
|---|---|---|---|
| 1 | 1.3 | 5 | 94 |
| 20 | 26 | 100 | 29 |
| 50 | 65 | 250 | 4.5 |
| 100 | 130 | 500 | 0.2 |
| 200 | 260 | 1000 | 0.0004 |

In practice, the thickness of shielding layer 336, as disclosed in Table 1, may be applied to an inner surface, an outer surface, or within a thin layer tube or a sleeve made of either fiberglass or metal. Coatings like these may be applied by thermal spray-on or by painting. A spray-on or painting would easily make the thickness more than a few hundred μm. In examples, shielding layer 336 may be disposed on the inner surface of the thin layer tube, so that shielding layer 336 may be facing pulsed neutron logging tool 132. pro-tected by the extra fiberglass or metal layer against borehole 116 or in mud channel 340 (e.g., referring to FIG. 13).

Referring back to FIGS. 1 and 2, pulsed neutron logging tool 132 takes any number of measurements during mea-surement operations. These measurements may then be utilized in MCNP model. The MCNP model may be created and/or performed utilizing information handling system 120 and/or NN 900 (e.g., referring to FIG. 9), described above. The MCNP model may set known variable values of pulsed neutron logging tool 132. For example, variables may com-prise a set of Lanthanum Bromide (LaBr$_3$) scintillator detec-tors (i.e., near gamma ray scintillator detector 322, far gamma ray scintillator detector 324, and long gamma ray scintillator detector 326 (e.g., referring to FIGS. 3A-3C)) with various sizes placed at different locations, and pulsed neutron generator 308. Detection area 304 was covered by a natural Boron disposed on shielding layer 336 of 1.0 mm thickness (e.g., referring to FIGS. 3A-3C). The MCNP model may also comprise various variables within formation 204. For example, variables may comprise different litholo-gies, porosities, and fluids or gas. Additionally, formations 204 may comprise mixtures of dolomite and quartz in ratios of 20:80, 40:60, 60:40, 80:20. and may also comprise porosities ranging from 0 P.U. to 40 P.U. (porosity unit) while pore space may be filled with freshwater, salt water as well as gas. Thus, the MCNP model variables may be populated based at least in part on measurements taken by pulsed neutron logging tool 132, characteristics specific to pulsed neutron logging tool 132, and/or characteristic specific to formation 204. Results from the MCNP model may be further verified and/or calibrated against a neutron tool in a set of physical formation tanks in the laboratory.

Figure 14:
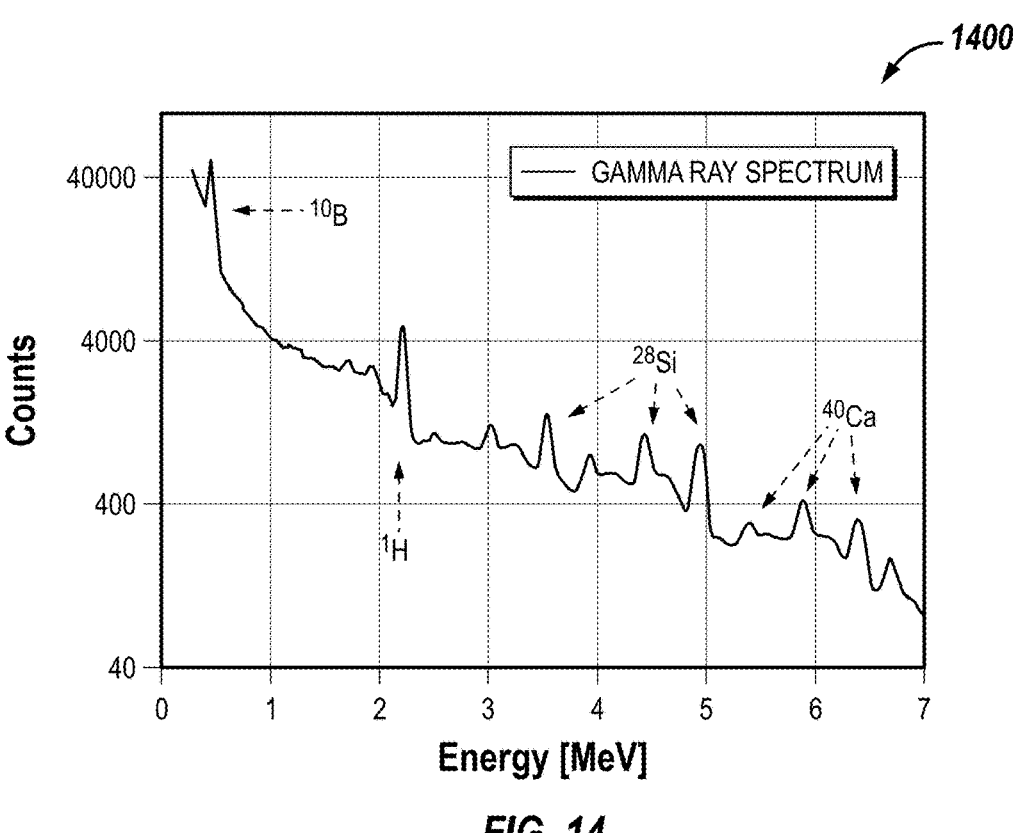
FIG. 14 is a graph of an example gamma ray spectrum.

FIG. 14 is a graph that illustrates an example capture gamma ray spectrum 1400 by far gamma ray scintillator detector 324 during the capture counting window, i.e., the OFF state of pulsing scheme (i.e., discussed above in FIG. 11), as a function of gamma ray energy. Measurements graphed are at least in part measurements from pulsed neutron logging tool 132 (e.g., referring to FIGS. 1 and 2) in a controlled environment. A controlled environment may be a steel tank. The controlled environment may comprise a mixture of dolomite and quartz and freshwater at 20 PU— porosity unit. A total of 10 billion fast neutrons 318 (e.g., referring to FIGS. 3A-3C) were generated and then measured by pulsed neutron logging tool 132. The MCNP model was utilized, at least in part, to form the graph illustrated in FIG. 14. The graph is a captured gamma ray spectrum 1400 that corresponds to a forty second data accumulation while with a pulsed neutron generator 308 (e.g., referring to FIGS. 3A-3C) operating with a $2.5 \times 10^8$ n/s flux. Captured gamma ray spectrum 1400 reveals Hydrogen capture peaks at 2.2 MeV distinctively, along with Boron gamma rays at 0.48 MeV, $^{28}$Si peaks or escaping peaks at 3.02, 3.53, 4.44, 4.95 MeV, and $^{40}$Ca peaks or escaping peaks at 5.40, 5.91, 6.42 MeV respectively. Silicon and Calcium were in the mixture of dolomite and quartz formation, while Hydrogen from freshwater, and of course, Boron gamma rays were from thermal neutrons 328 captured and converted by Boron disposed on shielding layer 336 that covered detection area 304.

There may be any number of methods and algorithms for processing the gamma ray spectrum 1400, as illustrated in FIG. 14, for spectroscopy and other measurements and for determining properties of formation 204. For this example, an algorithm of sensitive nonlinear iteration peak (SNIP) algorithm may be used to subtract the background of gamma ray spectrum 1400 and to extract a Boron peak, along with other elemental peaks, for determining the properties of formation 204.

Figure 15:
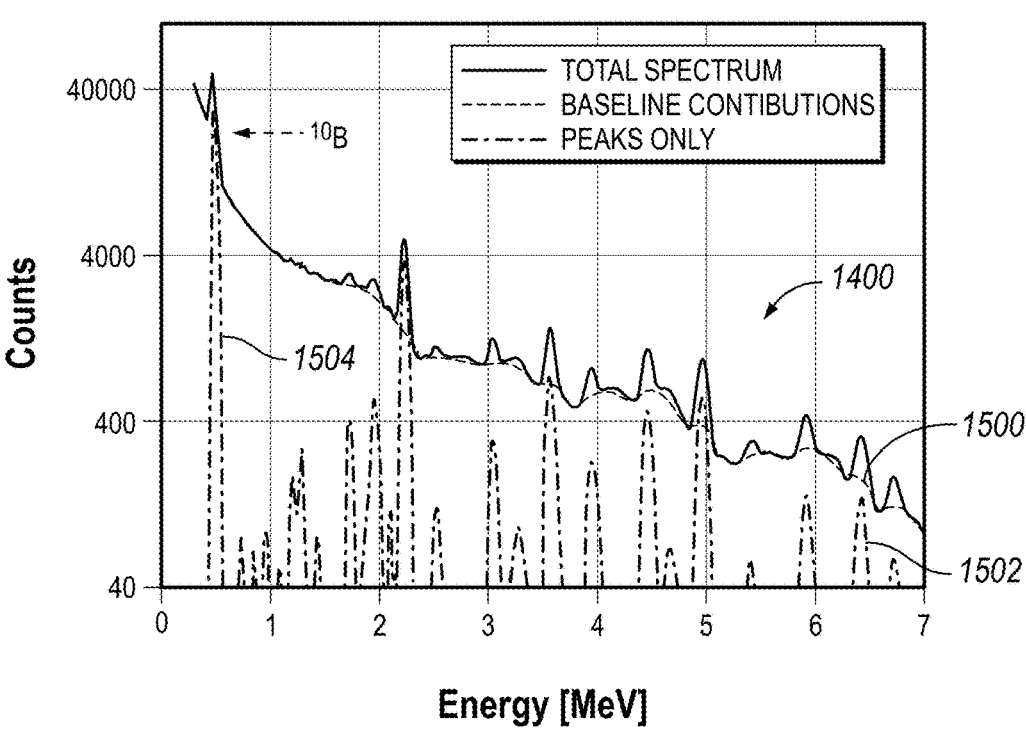
FIG. 15 is a graph illustrating peaks created from the gamma ray spectrum in FIG. 14.

FIG. 15 is a graph that illustrates an example of spectral stripping based on the SNIP algorithm, from the total gamma ray spectrum 1400 as shown in FIG. 14, after subtracting a baseline contribution 1500, to peaks only 1502. After the stripping of baseline contributions 1500, a raw Boron gamma peak 1504 at 0.48 MeV, and the rest of elemental capture peaks 1502 over the entire energy range are shown separated from each other, easier to identify, and easy to quantify. As illustrated, the Boron gamma ray counting rate is very high (e.g., the tallest peak in gamma ray spectrum 1400), which gives a high statistical precision (e.g., High precision measurement of peak strength) in measurements. This is due to the large phase space of shielding layer 336 covering detection area 304 of pulsed neutron logging tool 132 (e.g., referring to FIGS. 3A-3C), in comparison to the small volumes of detectors (i.e., $^3$He tubes), and in addition to the high neutron flux from pulsed neutron generator 308 which is not available from a chemical source such as AmBe. It should be noted that not all Boron gamma rays are detected. Some of the Boron gamma rays from back side 1200 of pulsed neutron logging tool 132 may not reach scintillator detectors (i.e., near scintillator gamma ray detector 322, far scintillator gamma ray detector 324, and long scintillator gamma ray detector 326) due to shielding from the structure of pulsed neutron logging tool 132, as described above. Further, the Boron gamma rays may be isotropic, and with scintillator detectors (i.e., near scintillator gamma ray detector 322, far scintillator gamma detector 324, and long scintillator gamma ray detector 326) placed inside shielding layer 336, about 30% may be detected by far scintillator gamma detector 324 (e.g., referring to FIGS. 3A-3C).

Figure 16:
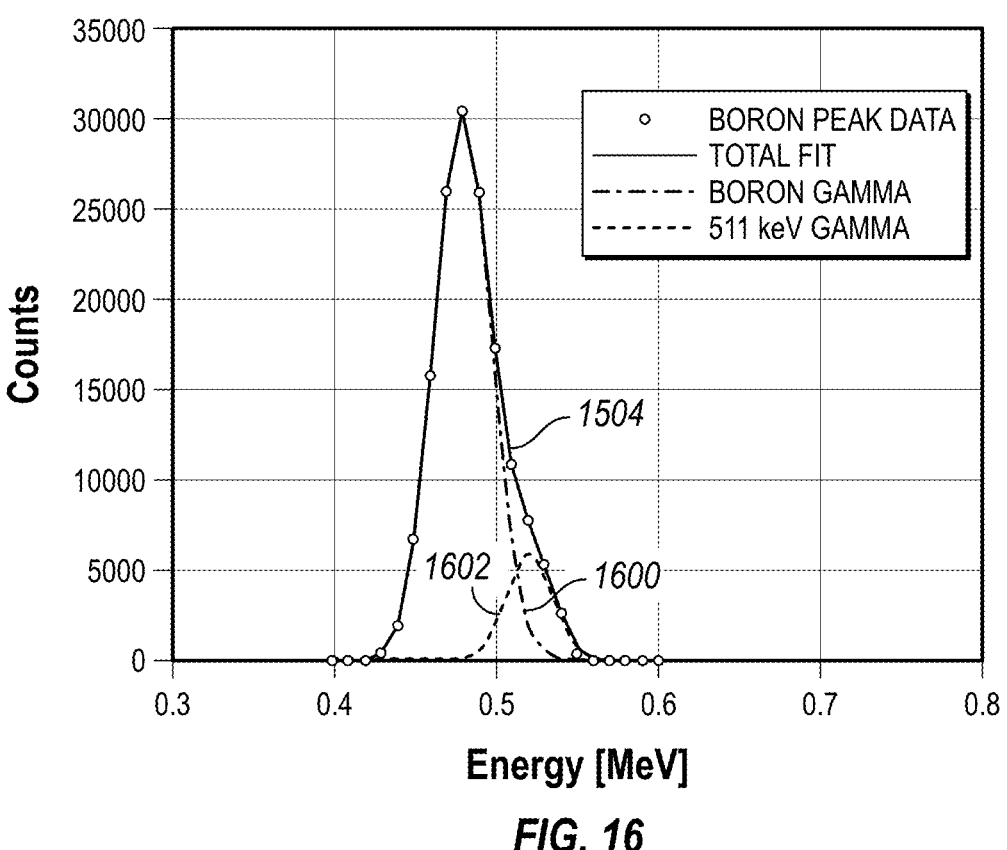
FIG. 16 is a graph of a Boron peak from FIG. 15 in an expanded view.

FIG. 16 is a graph that illustrates a zoom-in view of the raw Boron gamma ray peak 1504 from measurements and analysis performed in FIGS. 14 and 15. As illustrated, raw Boron gamma ray peak 1504 may be further analyzed with a fit of two Gaussian functions, for a subtraction of 0.511 MeV gamma ray contributions. This may yield contributions of Boron gamma ray 1600 at 0.48 MeV and the 0.511 MeV gamma rays (i.e., line 1602). The latter, although relatively small, arises from annihilation processes of high energy gamma rays which traverse through formation 204 and the body of pulsed neutron logging tool 132 (e.g., referring to FIGS. 1 and 2).

When utilizing pulsed neutron logging tool 132, the contributions of 0.511 MeV gamma rays (i.e., line 1602) may be high (e.g., not too small compared to B capture peak). These may be attributed from both fast neutron scattering, and thermal neutron capture inside the body of pulsed neutron logging tool 132, which may comprise metal materials, thus producing high energy gamma rays (e.g., a few MeV or higher). These high energy gamma rays then undergo annihilation processes and generate more secondary 0.511 MeV gamma rays (i.e., line 1602) due to high atomic numbers of metal materials inside the body of pulsed neutron logging tool 132. However, as disclosed above, pulsed neutron logging tool 132 may be covered by shielding layer 336, which may prevent thermal neutrons 328 from entering the body of pulsed neutron logging tool 132. In examples, a plurality of thermal neutrons 328 may be captured by the shielding layer 336 and converted to Boron gamma rays 1600 at 0.48 MeV. Further, one or more thermal neutrons 328 that may pass through shielding layer 336 may be captured by the body of pulsed neutron logging tool 132, which may comprise metal materials (e.g., referring to FIGS. 3A-3C). Further, Boron gamma ray measurements may be performed during the OFF state of pulsing scheme (e.g., referring to FIG. 11), i.e., avoiding fast neutron inelastic scattering of the tool body materials as well. These conditions may result in a minimum contribution of 0.511 MeV gamma rays (i.e., line 1602) to Boron gamma ray peak 1600, as seen in the graph of FIG. 16. That is, the Boron gamma ray peak 1600 measurements may be rather pure, after the fitting and subtraction illustrated in FIGS. 15 and 16.

With extraction of Boron gamma ray peak 1600, as illustrated in FIG. 16, and extraction of other elemental gamma ray peaks as shown in FIG. 15, the capture gamma rays may be integrated to form a total count, which relates to the population of thermal neutrons 328 in thermal neutron cloud 1000 (e.g., referring to FIG. 10). By forming a ratio between the extracted Boron gamma rays and the total count, a normalized Boron peak yield may be obtained, normalized against the size and density of thermal neutron cloud 1000, which otherwise, may not be available in a conventional porosity tool. This may be advantageous when the disclosed porosity measurements may be carried out simultaneously with capture gamma ray spectroscopy, and during the OFF state (e.g., referring to FIG. 11) of pulsed neutron generator 308 (FIGS. 3A-3C). Thus, eliminating influences of fast neutrons 318 on thermal neutron porosity, by using counting gates for scintillator detectors (i.e., near scintillator gamma ray detector 322, far scintillator gamma detector 324, and long scintillator gamma ray detector 326 (e.g., referring to FIGS. 3A-3C)). Measurements may be processed in the form of either a single detector alone in the normalized Boron peak yield, or the so-called near and far ratio as in the conventional neutron porosity tools, or both for confirming the data quality.

Figure 17:
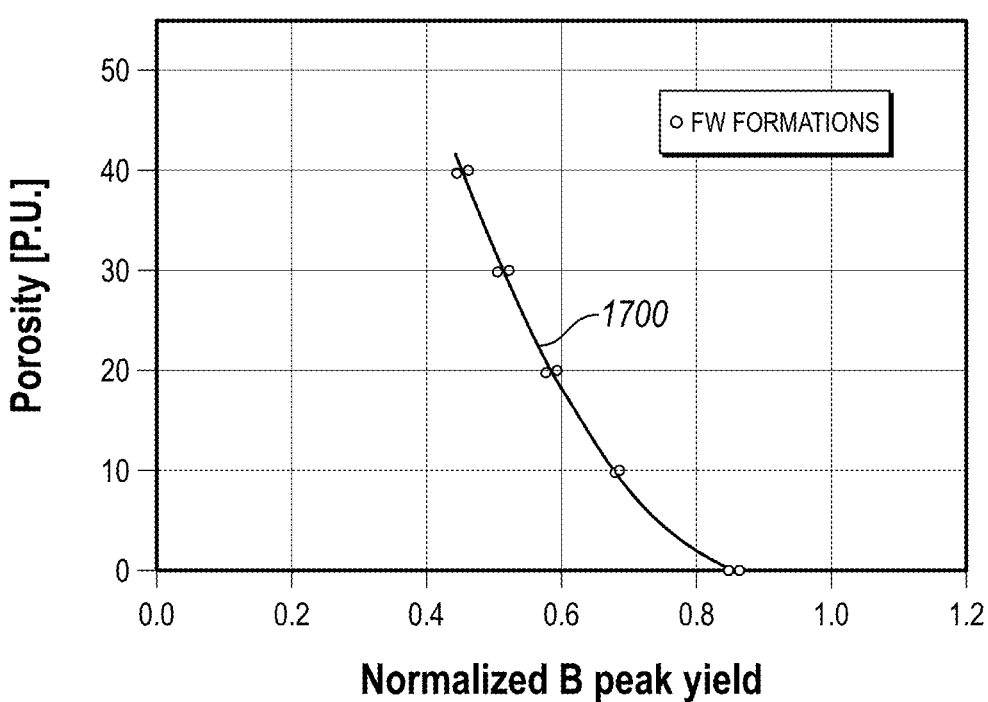
FIG. 17 is a graph of a Boron peak yield in a freshwater formation.

FIG. 17 is a graph that illustrates a normalized Born peak yields (i.e., line 1700) in formations 204 (e.g., referring to FIG. 2) filled with freshwater, from measurements processed in the form of a single detector. The normalized Boron peak yields (i.e., line 1700), from far scintillator detector (i.e., near scintillator gamma ray detector 322, far scintillator gamma detector 324, and long scintillator gamma ray detector 326 (e.g., referring to FIGS. 3A-3C)), may be plotted against porosities from formation 204 with various lithologies, with different mixing ratios for example between dolomite and quartz, with porosities ranging from 0 P.U. to 40 P.U. filled with freshwater. As illustrated in the graph, the data may be fitted with a single line to form a conversion of porosities from normalized Born peak yields (i.e., line 1700). That is, the porosity measurements are semi-absolute, after normalized to the total capture gamma ray counts, which are proxies of thermal neutron clouds 1000. This may be an improvement over conventional neutron porosity tools that may utilize $^3$He tubes.

Further the extracted porosity may be less sensitive to borehole fluids and borehole fluidic salinity, in contrast to the conventional neutron porosity tools based on $^3$He tubes. As noted above, this may be expected due to shielding layer 336 disposed on surface 338 of neutron logging tool 132, which may quickly absorb most thermal neutrons 328 in borehole 116 so that borehole fluidic effects may be minimized (e.g., referring to FIGS. 3A-3C). Nevertheless, by forming ratios between near scintillator detector 322 and far scintillator detector 324, the borehole effects may still be confirmed or disentangled although they are small. The ratios among different detectors may also potentially reveal or disentangle formation porosity differences at different depths of investigation. However, other effects may alter measurements of extracted porosities. Specifically, formation salinity and formation 204 filled with gas in the pore spaces may affect the porosity measurements, which may occur to conventional neutron porosity tools.

Figure 18:
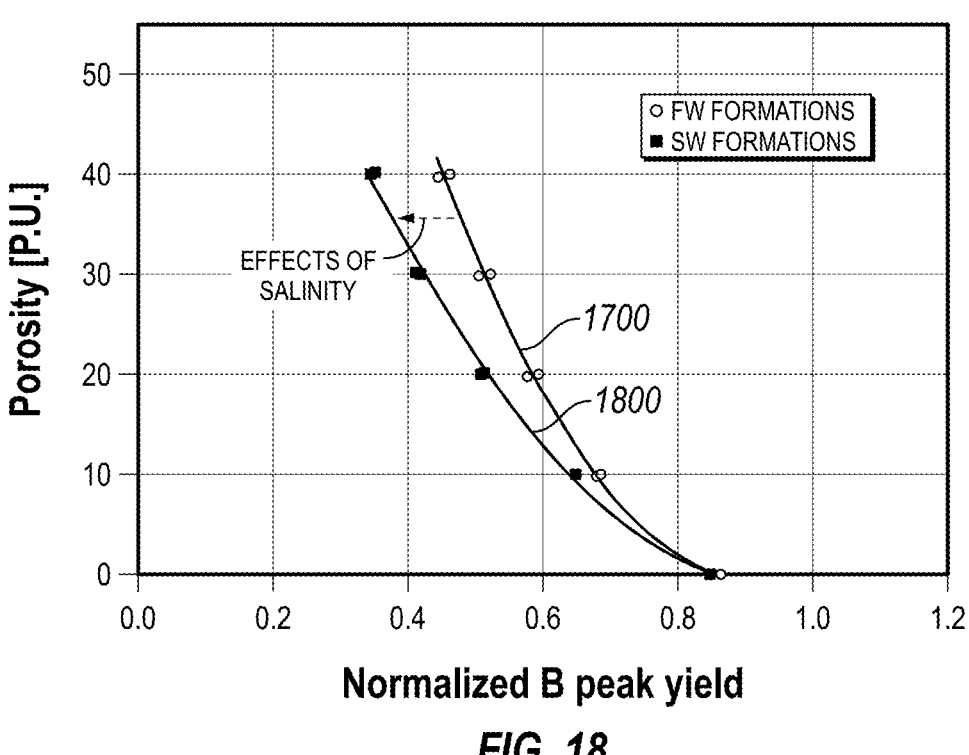
FIG. 18 is a graph of a Boron peak yield in a freshwater formation vs a Boron peak yield in a salt water formation.

FIG. 18 is a graph that illustrates normalized Boron peak yields for formations 204 (e.g., referring to FIG. 1) at least in part filled with salty water (SW) (i.e., 1800) and formations 204 at least in part filled with freshwater (FW) (i.e., line 1700). The normalized Boron peak yields, i.e., the ratios of Boron peak yields and the total capture peak yields integrated over the entire energy range, for various salty water filled formations with different lithologies and known porosities (i.e., line 1800), may be compared with the freshwater (FW) formations (i.e., line 1700) as shown in FIG. 17 for far scintillator detector 324. Similarly, data may be fitted with simple functions. Data also has little sensitivities on the formation lithologies. But the effect of salinity is large compared to lithology effect. That is, many thermal neutrons 328 (e.g., referring to FIGS. 3A-3C) are quickly captured by the Chlorine content in the saltwater formation. Thus, not many thermal neutrons 328 would come back to pulsed neutron logging tool 132 to be captured by shielding layer 336 (e.g., referring to FIGS. 3A-3C). Therefore, the normalized Boron peak yields, in this case for far scintillator detector 324, may be lowered and would give an enlarged and "false" neutron porosities. However, if combined with Chlorine yield measurements from spectroscopy or measurements from other scintillator detectors such as near scintillator detector 322, the saltwater effect may be corrected.

Figure 19:
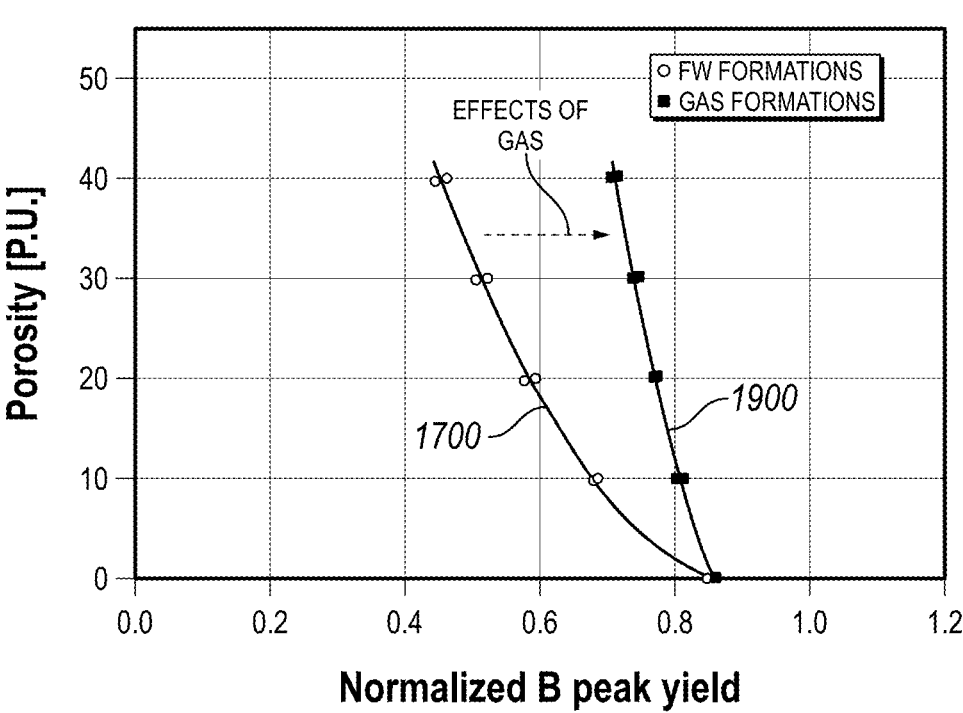
FIG. 19 is a graph of a Boron peak yield in a freshwater formation vs a Boron peak yield in a gas formation.

FIG. 19 is a graph illustrating Boron peak yields for various gas filled formations. As illustrated, the normalized Boron peak yields, i.e., the ratios of Boron peak yields and the total capture peak yields integrated over the entire energy range, for various gas filled formations with different lithologies and known porosities (i.e., line 1900), may be compared with the freshwater (FW) filled formations (i.e., line 1700) as shown in FIG. 17, for far scintillator detector 324. Again, data may be fitted with simple functions, which show insensitive to the formation lithologies, but a much larger effect from gas in comparison with freshwater filled formations. This is similar to the so-called "crossing" phenomena in a density and neutron porosity plot from the conventional "triple-combo" measurements in a gas zone.

In a gas formation, when the pore spaces may be filled with gas (lower Hydrogen content), instead of water (higher Hydrogen content), both fast neutrons thermalizing and thermal neutrons capturing processes are slowed. This may increase the size of thermal neutron cloud 1000 (i.e., referring to FIG. 10). Generally, thermal neutrons 328 may be captured at deeper formation depth, and their capture gamma rays may not be detected, for example, in far scintillator detector 324. The total capture peak yield integrated over the entire energy range from far scintillator detector 324 may no longer serve as a size proxy of thermal neutron cloud 1000. Thus, the normalized Boron peak yields may give reduced and "false" neutron porosities. However, if combined with other measurements or measurements from other scintillator detectors such as long scintillator detector 326, this may serve as a gas indicator.

Furthermore, these effects may be disentangled by measurements from the multiple detectors (i.e., near scintillator gamma ray detector 322, far scintillator gamma detector 324, and long scintillator gamma ray detector 326 (e.g., referring to FIGS. 3A-3C)). For example, on the one side, formation gas effects may be strong on far scintillator detector 324, but they are small on long scintillator detector 326, which may be designed to handle the cases of larger size thermal neutron clouds 1000 (e.g., referring to FIG. 10). The normalized Boron peak yields based on long scintillator detector 326 may give the right results of neutron porosities for formations 204 filled with gas (e.g., referring to FIGS. 1 and 2). On the other side, the formation salinity effects may be smaller on near scintillator detector 322 which may be more sensitive to a shallow depth than far scintillator detector 324. The normalized Boron peak yields based on near scintillator detector 322 may yield a value of neutron porosities for formations 204 with high salinities (i.e., Greater than 100 kppm). Thus, the technique of multi-detectors, with different spacings and with their independent sensitivities to thermal neutron porosities, allows the multi-depths of investigation of formation 204, and disentangles the effects of salinity and gas. These measurements may serve as a gas indicator or may be used for determination of formation salinity.

With the simultaneous neutron porosity and spectroscopy measurements taken by pulsed neutron logging tool 132 with multiple scintillator detectors (i.e., near scintillator gamma ray detector 322, far scintillator gamma detector 324, and long scintillator gamma ray detector 326 (e.g., referring to FIGS. 3A-3C)), formation properties may be determined with combined results. Formation properties such as Sigma, Carbon-Oxygen ratio (C/O), Chlorine yields, Hydrogen contents, formation lithology, formation density, formation porosity and formation fluids may be determined based on multiple sources of information. The disclosed thermal neutron porosity measurements may, at least in part, provide independent and reliable results for confirmation and consistence in determining formation properties.

Figure 20:
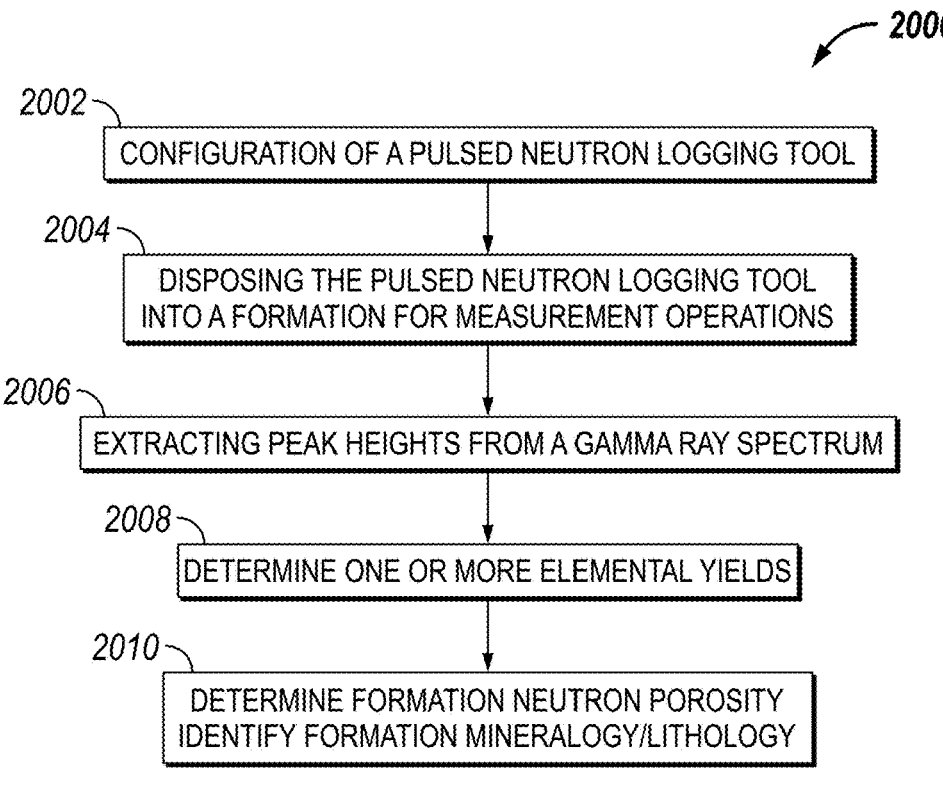
FIG. 20 is a workflow for neutron porosity and mineralogy/lithology measurements for either Wireline or LWD.

FIG. 20 is a workflow 2000 for neutron porosity and mineralogy/lithology measurements for either Wireline or LWD. Workflow 2000 may begin with block 2002. In block 2002, pulsed neutron logging tool 132 is configured for a measurement operation. For example, pulsed neutron logging tool 132 may be equipped with multiple scintillator detectors (i.e., near scintillator gamma ray detector 322, far scintillator gamma detector 324, and long scintillator gamma ray detector 326 (e.g., referring to FIGS. 3A-3C)), pulsed neutron generator 308, a pulsing scheme to control pulsed neutron generator 308, and shielding layer 336, which may be disposed on surface 338 of pulsed neutron logging tool 132 to cover detection area 304.

In block 2004, pulsed neutron logging tool 132 may be disposed within borehole 116 either in a Wireline or LWD configuration for measurement operations. During measurement operations of formation 204, gamma ray energy spectra may be measured and/or recorded during various timing windows of pulsing neutron generator 308. Measurements may be taken by using the multiple scintillator detectors (i.e., near scintillator gamma ray detector 322, far scintillator gamma detector 324, and long scintillator gamma ray detector 326 (e.g., referring to FIGS. 3A-3C)). Measurements operations may comprise counting prompt gamma rays to form a gamma ray spectrum 1400 (e.g., referring to FIG. 14) at various timing windows at one or more multiple scintillator detectors (i.e., near scintillator gamma ray detector 322, far scintillator gamma detector 324, and long scintillator gamma ray detector 326 (e.g., referring to FIGS. 3A-3C)) associated with the pulsing scheme controlling pulsed neutron generator 308.

The measurements from block 2004 may be processed in block 2006 to extract peak heights from gamma ray spectrum 1400. For example, the Boron gamma ray peak heights may be extracted and fitted with subtraction of 0.511 MeV, during capture counting timing windows for multiple scintillator detectors, contributions from annihilation reactions, along with other elemental gamma ray peaks as a part of spectroscopy measurements of materials in formation 204.

In block 2008, elemental yields may be determined. For example, ratios of Boron gamma ray peak heights (total counts) may be formed between multiple scintillator detectors (i.e., near scintillator gamma ray detector 322, far scintillator gamma detector 324, and long scintillator gamma ray detector 326 (e.g., referring to FIGS. 3A-3C)) with different spacings to pulse neutron generator 308. Normalized Boron yield may be determined by the ratio between the Boron gamma ray counts and the total capture counts from an individual scintillator detector (i.e., near scintillator gamma ray detector 322, far scintillator gamma detector 324, and long scintillator gamma ray detector 326 (e.g., referring to FIGS. 3A-3C)).

In block 2010, using the analysis from block 2008, formation neutron porosity may be determined based on the normalized Boron yield and/or ratios of Boron gamma ray counts between detectors at different positions. At the same time, formation spectroscopy measurements may be processed as well. Measurements are combined to determine the formation properties, which include formation and borehole Sigma's, Carbon-Oxygen ratio (C/O), Hydrogen and Chlorine contents, salinity, formation elemental weights and lithologies, as well as indication of gas in the formation.

FIGS. 14-19 illustrate graphs of different analyses of Boron peaks. As discussed above, methods may comprise fitting the measured gamma ray spectrum to a set of laboratory standards, the elemental yields and weight fractions of formation 204 (e.g., referring to FIGS. 1 and 2) may be determined. However, this approach becomes challenging when a gamma ray peak sits atop a large exponential-like background. Such a background may be present in the LWD or Wireline settings as a consequence of neutron-induced gamma-ray reactions in either the heavy metal drilling collar or casing string 202 (e.g., referring to FIG. 2). Since the shape of this background may possibly be formation dependent, the chance of increased fitting error is introduced.

As discussed below, a method may operate and function to perform a spectral analysis on gamma ray peaks only for Boron and other elements, excluding all the continuum background. The excluded background, which may be determined using a numerical algorithm, may comprise a drilling collar or casing background and also Compton/Bremsstrahlung background. The spectrum that remains after excluding the background is termed a "peaks only" spectrum. Such a spectrum may be windowed or fit to "peaks only" elemental standards in order to extract the elemental yields and weight fractions. The advantage of the "peaks only" approach is the elimination of any error that is associated with the uncertain, and possibly formation dependent, background.

Generally, elemental yields and weight fractions are invariably determined using the total spectrum, peaks and background together, rather than just the peaks only. The reason for this traditional approach is that it enables the use of the distinguishing information which is present in the total shape of each standard. Further, the traditional method avoids throwing away the large number of counts, usually constituting the majority of the total counts, which come from the continuum background. In measurement operations where the background has a large, exponential-like, and variable shape, a peaks-only approach offers certain advantages. For example, any fitting errors associated with the background are eliminated. And secondly, small peaks at low energies, which may sometimes be rendered invisible by a huge exponential-like background, become clear and distinct, and thus more amenable to quantitative evaluation.

Figure 21:
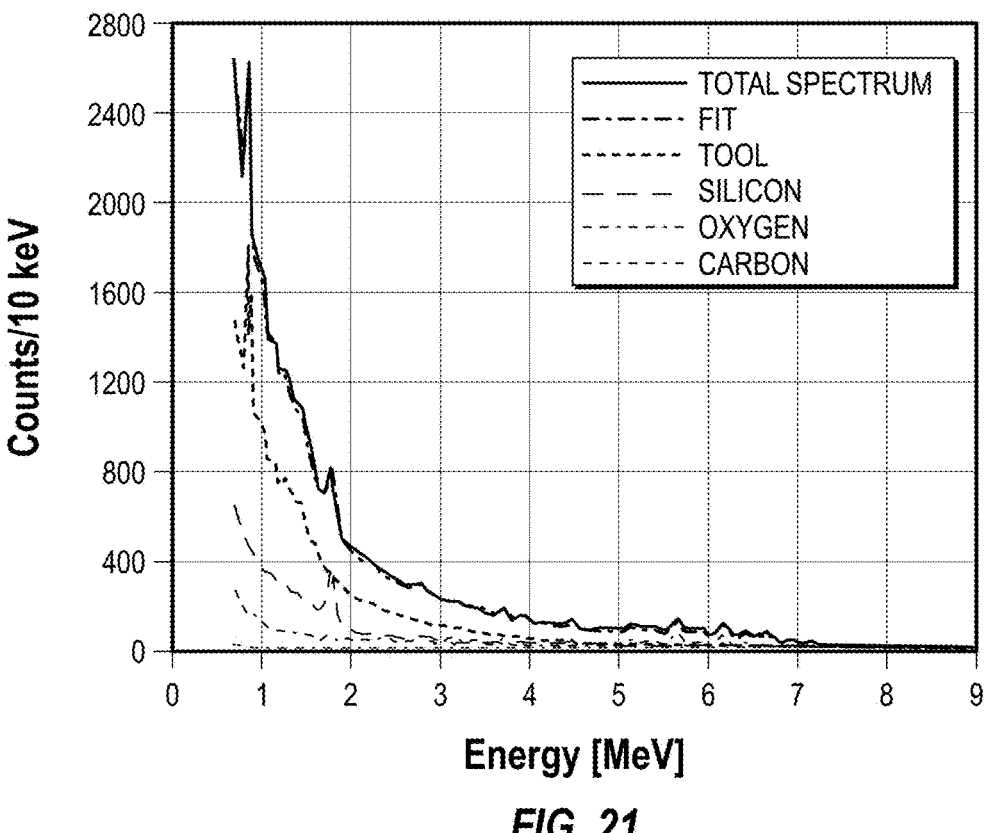
FIG. 21 is a graph showing a fit-to-standard method that may be used to obtain yield from a spectrum.

FIG. 21 is a graph showing results from a standard analysis procedure that may take the total neutron-induced gamma-ray spectrum and fit it to elemental standards. In this manner, the elemental yields and weight fractions may be obtained, as illustrated in FIG. 21. The fitting parameters associated with the fit-to-standards procedure are called the yields. By calibrating these yields (e.g. using laboratory derived sensitivities) the elemental weight fractions in formation 204 (e.g., referring to FIG. 2) may be found.

Figures 22A, 22B:
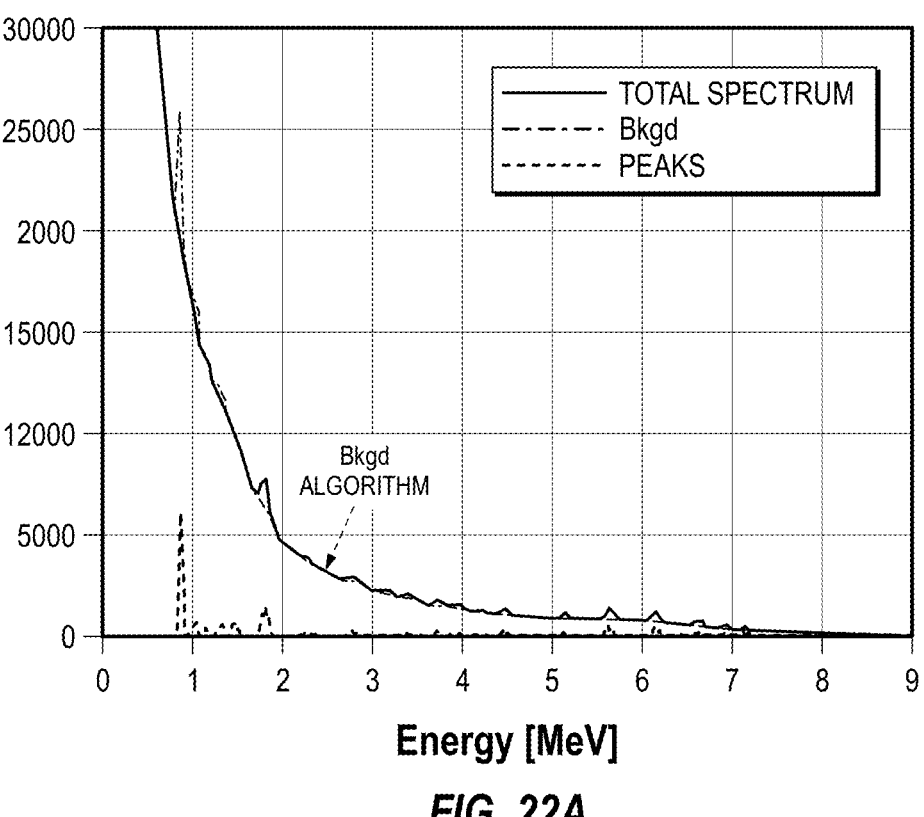
FIG. 22A is a graph illustrating peaks created from the gamma ray spectrum.
FIG. 22B is a close up of the graph from FIG. 22A showing peaks created.

FIG. 22A is a graph illustrating a "peaks only" method approach. Starting with the total spectrum, a numerical algorithm is used to get the continuum background shape. For example, this may be performed by utilizing the SNIP algorithm, discussed above, to form the continuum background shape, which may then be subtracted from the measured gamma ray spectrum 1400 (e.g., referring to FIG. 14) to form peaks. FIG. 22B is an exploded view of the "peaks" spectrum found in FIG. 22A.

Figure 23A:
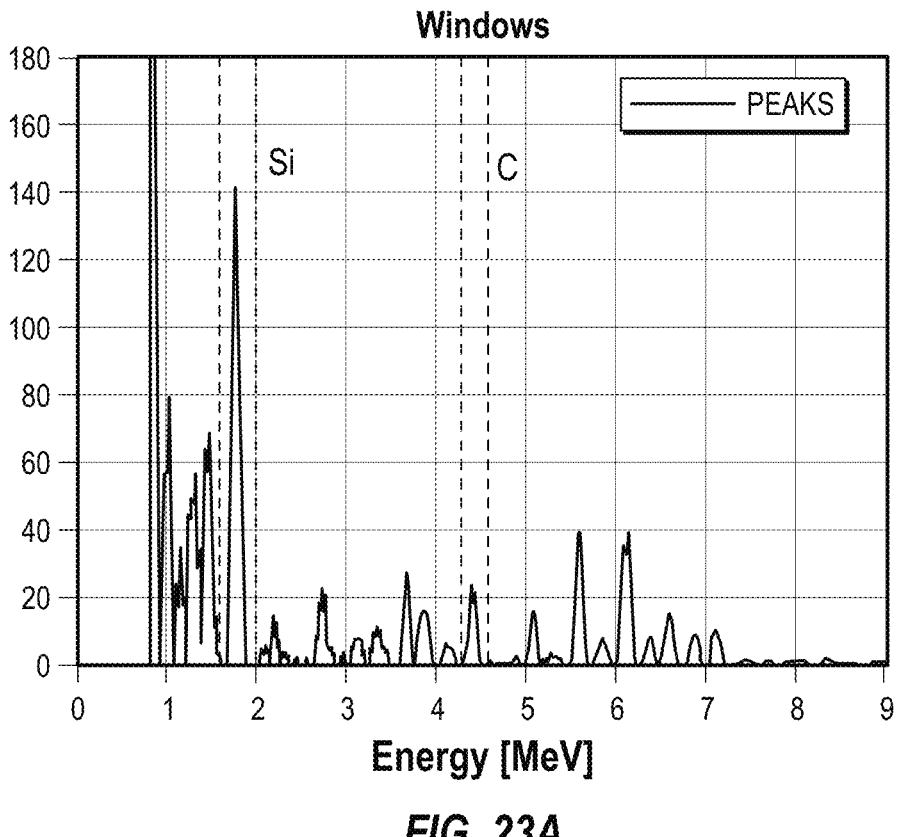
FIG. 23A a graph that shows an elemental composition may be obtained from the peaks-only spectrum by either windows or a fit-to-standards approach using peaks-only standards.
Figure 23B:
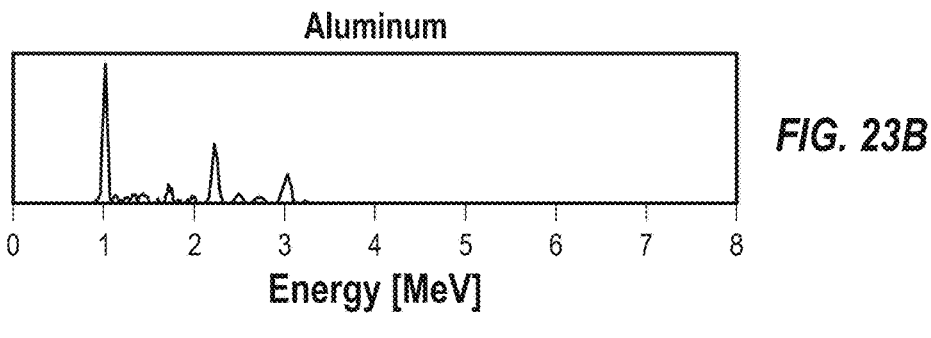
FIGS. 23B-23F are graphs of element only spectrums.
Figure 23C:
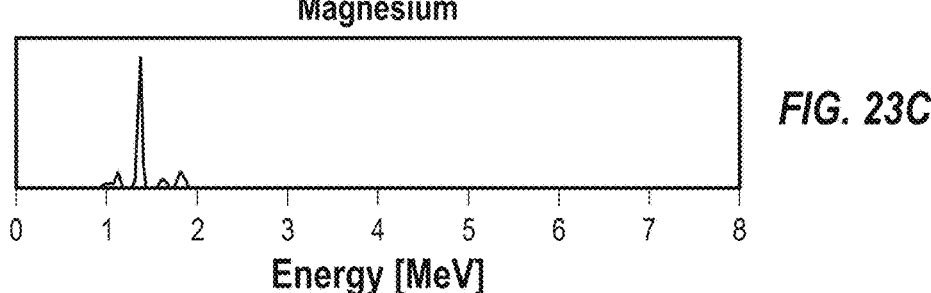
Figure 23D:
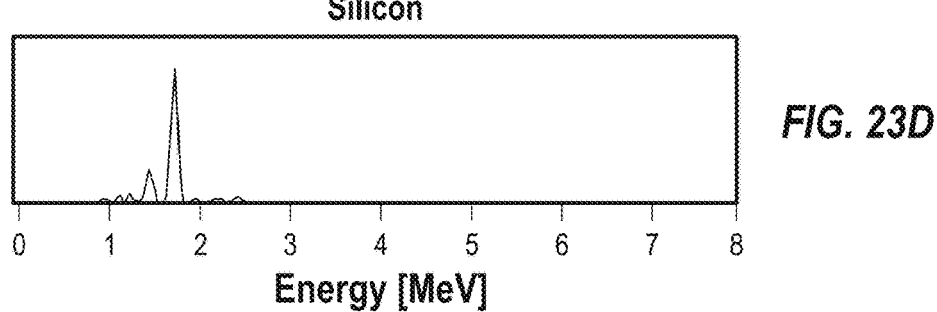
Figure 23E:
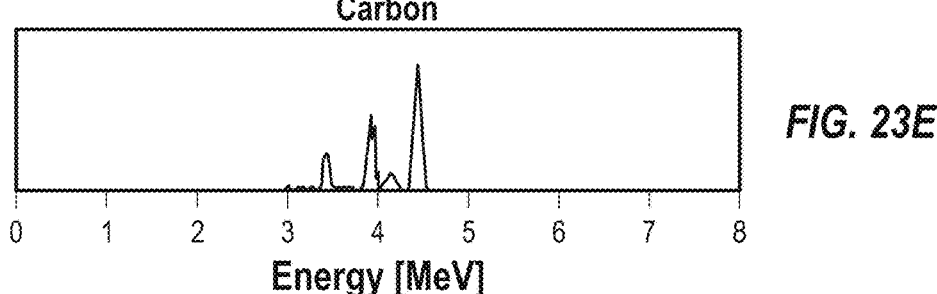
Figure 23F:
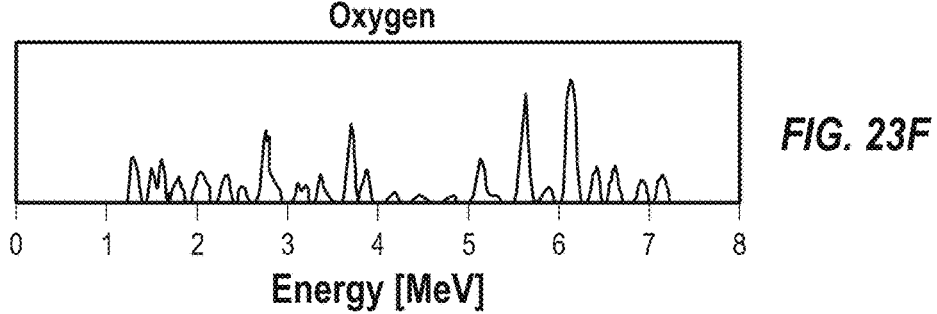

FIG. 23A is a graph that shows an elemental composition may be obtained from the peaks-only spectrum by either windows or a fit-to-standards approach using peaks-only standards. FIGS. 23B-23F are different elemental standards that can be fit to the peaks-only spectrum in order to obtain the yield for each element.

Figure 24A:
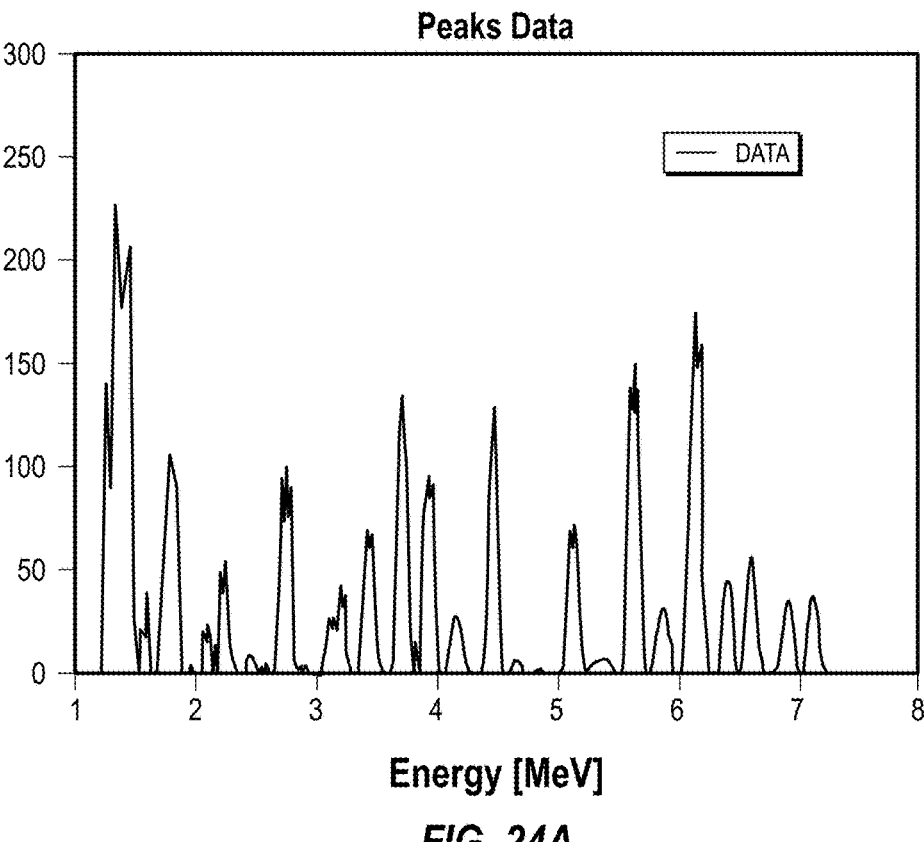
FIGS. 24A&24B are graphs illustrating fitting peak only element spectrums to peak only measured gamma ray spectrum.
Figure 24B:
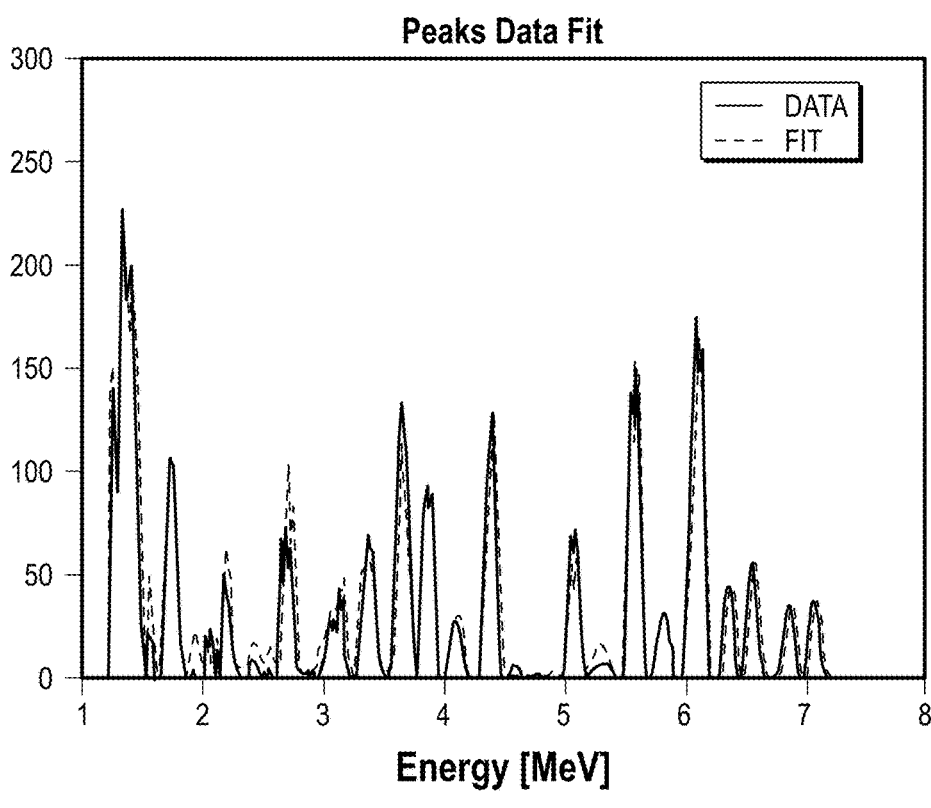
Figure 25A:
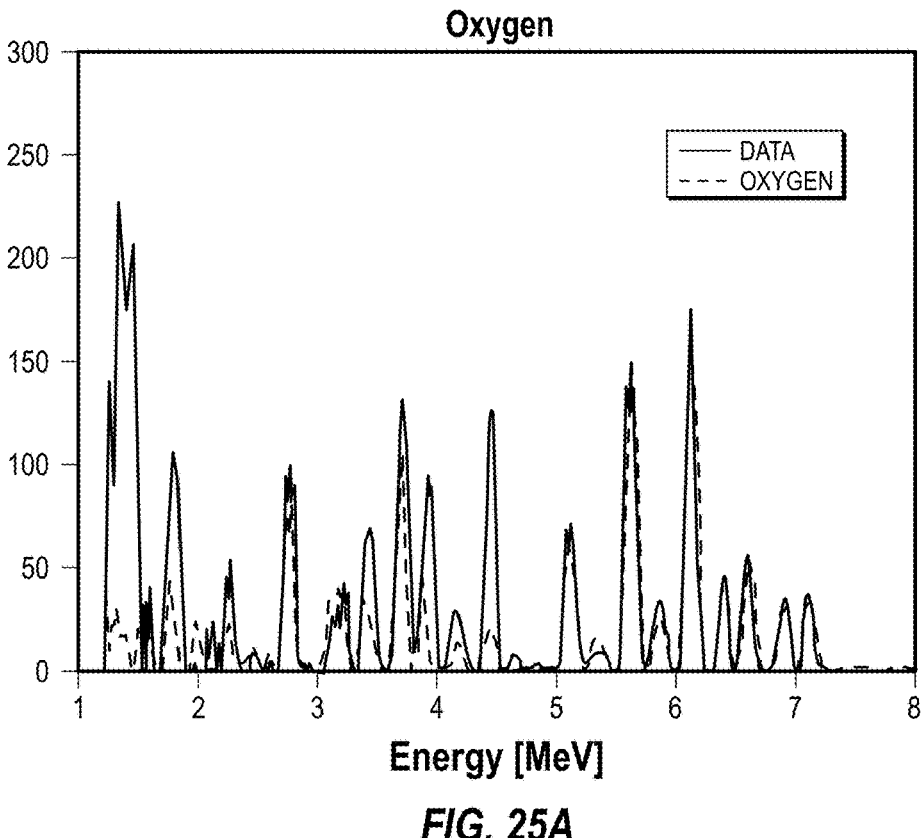
FIGS. 25A-25D are graphs showing specific peak only element spectrums applied to the peak only measured gamma ray spectrum.
Figure 25B:
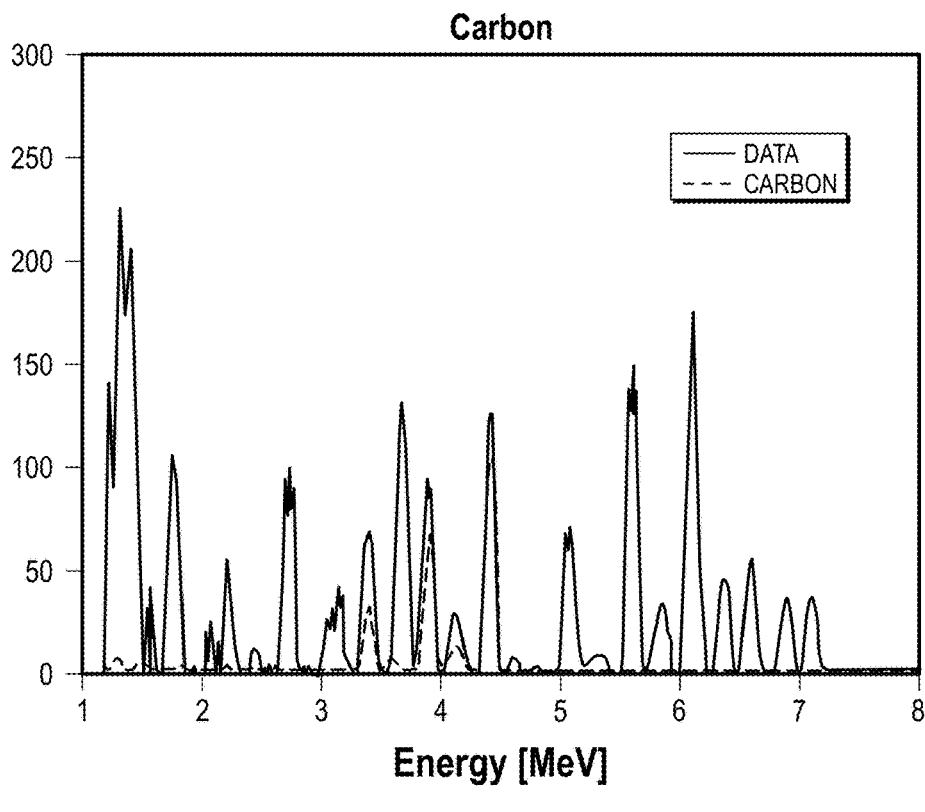
Figure 25C:
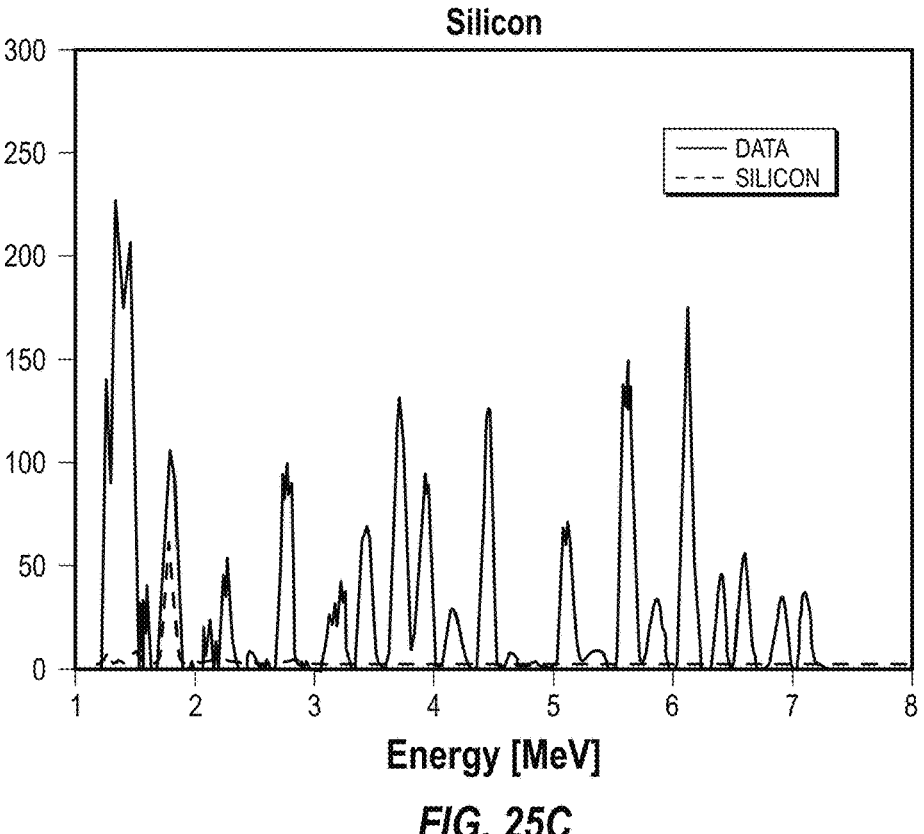
Figure 25D:
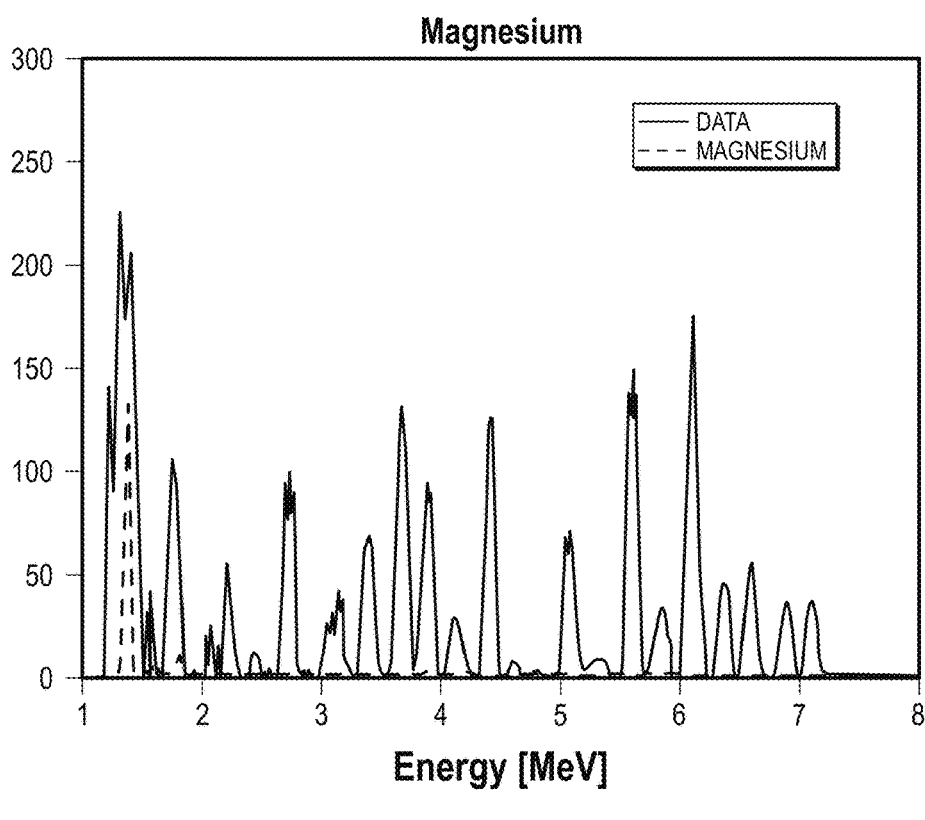

FIGS. 24A & 24B are graphs of the elemental yields that may be obtained from a peaks-only spectrum by fitting to a linear combination of standards. FIG. 24A is a graph of peaks-only inelastic spectrum as simulated in MCNP for a Dolomite/Quartz mixture. FIG. 24B is a graph illustrating a fit to the peaks only data using a linear combination of the elemental standards shown in FIG. 24A.

FIGS. 25A-25D are graphs illustrating different component elements fit standard time yields from measurement operations. Using the peaks-only method may allow for peaks to be more visible and more amenable to quantitative analysis once the exponential-like background is removed from gamma ray spectrum 1400 (e.g., referring to FIG. 14) found during measurement operations.

Figure 26:
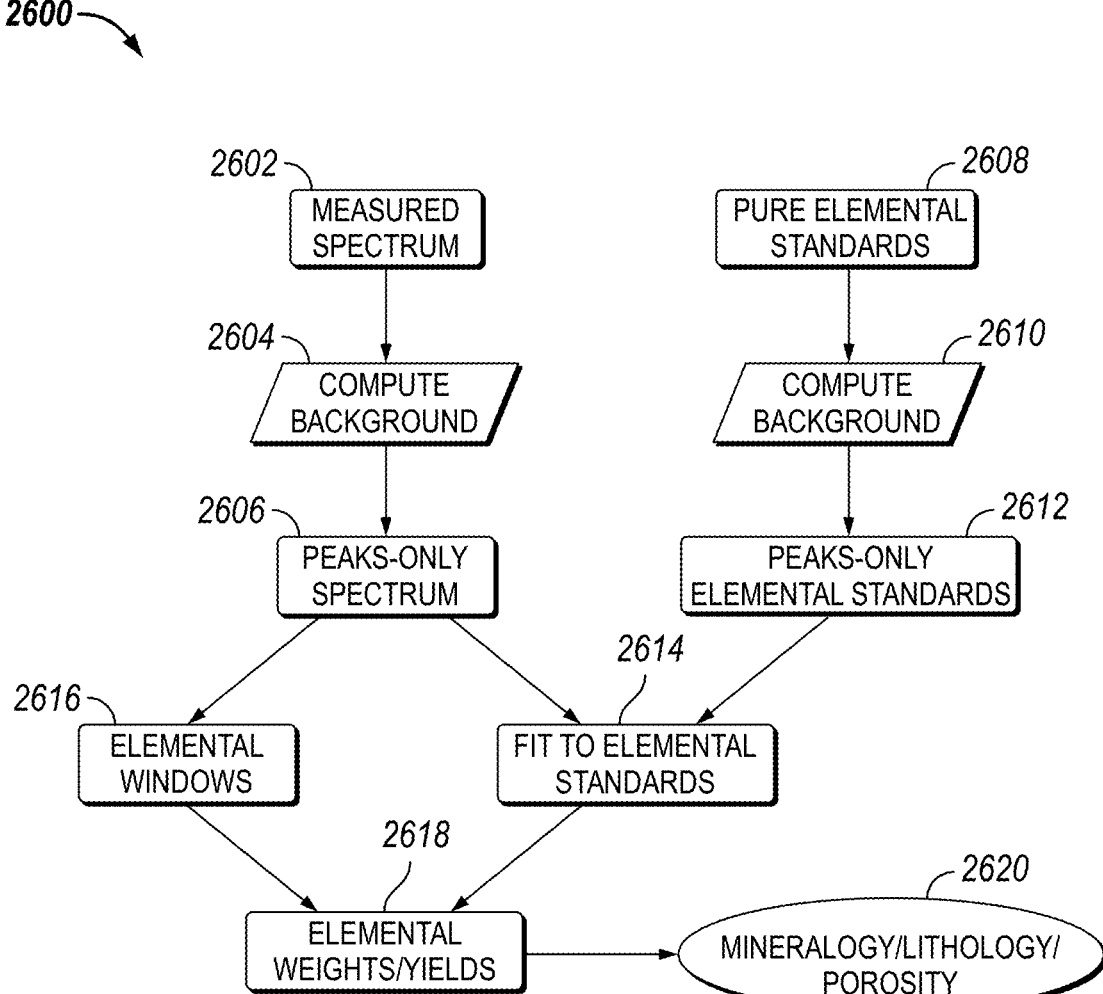
FIG. 26 is a workflow for using a peak-only analyses method on a gamma ray spectrum found during a measurement operation for either Wireline or LWD.

FIG. 26 illustrates workflow 2600 for using a peak-only analyses method on a gamma ray spectrum 1400 (e.g., referring to FIG. 14) found during a measurement operation for either Wireline or LWD. It should be noted that workflow 2600 may be performed at least in part on information handling system 120. Workflow 2600 may specifically reduce neutron-induced gamma-ray spectra, as acquired in geochemical logging, to peaks-only spectra, and then to fit these peaks-only spectra to peaks-only elemental standards in order to obtain elemental yields and weight fractions of formation 204.

Workflow 2600 may begin with block 2602. In block 2602, pulsed neutron logging tool 132 may perform a measurement operation in which a gamma ray spectrum 1400 may be obtained. In block 2604, gamma ray spectrum 1400 (e.g., referring to FIG. 14) from block 2602 may be analyzed so that the background may be computed. The background may be computed by running gamma ray spectrum 1400 through the SNIP algorithm, disclosed above, to identify a shape of the underlying background. Once the shape of the background is determined, it is subtracted from gamma ray spectrum 1400 to give a "peaks only" spectrum, as described above. After the background has been computed in block 2604 the output from block 2604 to block 2606 is a peaks-only spectrum.

In block 2608, a pure element standard is found using pulsed neutron logging tool 132 in a laboratory setting using laboratory procedures. Specifically, pulsed neutron logging tool 132 is disposed in a formation constructed in a laboratory of only a selected element. For example, a selected element may be silicon (Si) or any other chosen element. Once disposed in the constructed formation that may be constructed of a selected element, measurements may be taken by pulsed neutron logging tool 132. From the measurements a pure element standard gamma ray spectrum (referred to as a pure element standard) is created that shows the signature of chosen element in the laboratory constructed formation. In block 2610, the pure element standard from block 2608 may be analyzed so that the background may be computed. The background may be computed by running the pure element standard gamma ray spectrum through the SNIP algorithm, disclosed above, to identify a shape of the underlying background. Once the shape of the background is determined, it is subtracted from the purse element standard gamma ray spectrum to give a "peaks only" spectrum, as described above. In block 2612, after the background has been computed in block 2610 the output from block 2610 so block 2612 is a peaks-only element standard.

In block 2614 the peaks-only spectrum from block 2606 is compared to peaks-only element standard from block 2612 to form a fit element standard. The fit element standard may be found when the peaks-only spectrum from block 2606 may be fit to a linear combination of peaks-only element standard from block 2612 where the coefficients of the fit are the elemental yields. The fitting is done using known chi-squared minimization algorithms (e.g. Levenberg-Marquardt). Additionally, in block 2616, which may be done concurrently with block 2614, an elemental window may be identified. The elemental window in block 2616 may be selected based at least in part on the peaks-only element standard from block 2612 that may be compared to the peaks-only spectrum from block 2606. An elemental window is defined as method in which instead of fitting to a linear combination of standards, the peaks-only spectrum from block 2606 may be windowed to obtain yields for each peak that is associated with a given element. For example, carbon gamma-ray peaks are at 4.432 MeV. If a window is established from 4.2 to 4.6 MeV, it encompasses the carbon peak, and the count rate in the window will be proportional to the amount of carbon present.

In block 2618, the elemental window in block 2616 and the elemental fit in block 2614 may be utilized to find elemental weights and/or yields. The elemental yields are defined to be the fraction of the spectral counts that come from each element. These yields may be obtained through windows on peaks from blocks 2616 or 2614, respectively, or through fitting to a linear combination of normalized standards where the coefficients of the fit are the yields. Once the yields are obtained, the elemental weights may be determined by calibrating the yields to core or by utilizing a model like oxide closure. Using the elemental weights and yields in block 2618, mineralogy and lithology of formation 204 may be found in block 2620. Minerology and lithology may be found to be sandstone, limestone, dolomite, or combinations, or shaly layers, etc. At the same time as described earlier, formation neutron porosity may be determined based on the normalized Boron yield and/or ratios of Boron gamma ray counts between detectors at different positions as well.

As disclosed above, improvements over current technology may be found in the disclosed simultaneous neutron porosity measurements with pulsed neutron logging tool 132 for spectroscopy saves resources and costs. It eliminates a second neutron source, and it eliminates the need for thermal neutron detectors such as $^3$He tubes. It simplifies pulsed neutron logging tool 132 engineering and packaging. Further, the discussed improvements eliminate the need of a second tool in a tool string and eliminate the need for a second logging trip, save time and costs, in applications where two measurements in a single tool string may interfere with each other.

Pulsed neutron logging tool 132 for simultaneous measurements of neutron porosity and spectroscopy enables measurement operations to gather multiple types of measurements, with optimization and improved data quality, in a single logging trip. This effectively simplifies the tool engineering and packaging, saves the neutron generating tube lifetime and saves logging times on rigs.

Further, the methods described above that look at "peaks only" data for elemental gamma ray peaks only, excluding all the continuum background, simplifies the spectral analysis. The advantage of the "peaks only" approach is the elimination of any error that is associated with the uncertain, and possibly formation dependent, background. Formation elements may be clearly identified, and elemental weights and yields can be precisely determined (including Boron gamma ray peak yields). Thus, formation minerology and lithology can be identified, and porosity can be determined.

The preceding description provides various examples of the systems and methods of use disclosed herein which may contain different method steps and alternative combinations of components.

Statement 1: A system may comprise a pulsed neutron logging tool. The pulsed neutron logging tool may comprise a pulsed neutron generator for generating one or more neutrons, one or more gamma ray scintillator detectors disposed in a detection area for detecting one or more gamma rays, a shielding block that separates the pulsed neutron generator from the one or more gamma ray scintillator detectors, and a shielding layer disposed at least in part at the detection area. The system may further comprise an information handling system communicatively connected at least in part to the pulsed neutron logging tool. The information handling system is configured to create a gamma ray spectrum from the one or more gamma rays detected by the one or more gamma ray scintillator detectors, remove a background from the gamma ray spectrum to form a peaks-only spectrum, and compare one or more peaks-only elemental standards to the peaks-only spectrum to determine an elemental weight and yield.

Statement 2: The system of statement 1, wherein the information handling system is further configured to identify a minerology or a lithology from the elemental weight and yield.

Statement 3: The system of any previous claim 1 or 2, wherein the information handling system is further configured to determine a porosity of a formation based at least in part on the peaks-only spectrum.

Statement 4: The system of any previous claims 1-3, wherein the shielding layer is Boron.

Statement 5: The system of any previous claims 1-4, wherein the shielding block is Tungsten, Boron, or a combination of Tungsten and Boron.

Statement 6: The system of any previous claims 1-5, wherein the shielding layer is an element with a capture cross section and gamma production outside an energy range of interest between 0.7 MeV and 8 MeV.

Statement 7: The system of any previous claims 1-6, further comprising a mud flow channel is disposed in the pulsed neutron logging tool.

Statement 8: The system of statement 7, further comprising a second shielding layer is disposed on an inner surface of the mud flow channel.

Statement 9: The system of any previous claims 1-7, wherein the one or more peaks-only elemental standards are found using laboratory procedures to find a pure elemental standard for any selected element.

Statement 10: The system of statement 9, wherein the background is removed from the pure elemental standard to form the peaks-only elemental standard.

Statement 11: The system of any previous claim 1-7 or 9, wherein the one or more gamma ray scintillator detectors detect one or more gamma rays emitted from the shielding layer.

Statement 12: The system of statement 11, wherein the information handling system is further configured to determine a porosity of a formation based at least in part on the one or more gamma rays emitted from the shielding layer.

Statement 13: The system of any previous claim 1-7, 9, or 11, wherein the pulsed neutron generator is controlled by the information handling system to generate neutrons with ON and OFF states based on a pulsing scheme.

Statement 14: A method may comprise obtaining a gamma ray spectrum, removing a background from the gamma ray spectrum to form a peaks-only spectrum, and comparing one or more peaks-only elemental standards to the peaks-only spectrum to determine an elemental weight and yield.

Statement 15: The method of statement 14, further comprising identifying a minerology or a lithology from the elemental weight and yield.

Statement 16: The method of statement 15, further comprising determining a porosity of a formation based at least in part on the peaks-only spectrum.

Statement 17: The method of any previous claim 14 or 15, wherein the one or more peaks-only elemental standards are found using laboratory procedures to find a pure elemental standard for any selected element.

Statement 18: The method of statement 17, wherein the background is removed from the pure elemental standard to form the peaks-only elemental standard.

Statement 19: The method of statement 18, wherein the background is removed using a sensitive nonlinear iteration peak algorithm.

Statement 20: The method of any previous claim 14, 15, or 17, wherein an elemental window is selected in which the comparing one or more peaks-only elemental standards to the peaks-only spectrum is performed.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A system comprising:
a pulsed neutron logging tool that comprises:
   a pulsed neutron generator for generating one or more neutrons;
   one or more gamma ray scintillator detectors disposed in a detection area for detecting one or more gamma rays;
   a shielding block that separates the pulsed neutron generator from the one or more gamma ray scintillator detectors; and
   a shielding layer disposed at least in part at the detection area; and
an information handling system communicatively connected at least in part to the pulsed neutron logging tool, wherein the information handling system is configured to;
   create a gamma ray spectrum from the one or more gamma rays detected by the one or more gamma ray scintillator detectors;
   remove a background from the gamma ray spectrum to form a peaks-only spectrum; and
   compare one or more peaks-only elemental standards to the peaks-only spectrum to determine an elemental weight and yield.

2. The system of claim 1, wherein the information handling system is further configured to identify a minerology or a lithology from the elemental weight and yield.

3. The system of claim 1, wherein the information handling system is further configured to determine a porosity of a formation based at least in part on the peaks-only spectrum.

4. The system of claim 1, wherein the shielding layer is Boron.

5. The system of claim 1, wherein the shielding block is Tungsten, Boron, or a combination of Tungsten and Boron.

6. The system of claim 1, wherein the shielding layer is an element with a capture cross section and gamma production outside an energy range of interest between 0.7 MeV and 8 MeV.

7. The system of claim 1, further comprising a mud flow channel is disposed in the pulsed neutron logging tool.

8. The system of claim 7, further comprising a second shielding layer is disposed on an inner surface of the mud flow channel.

9. The system of claim 1, wherein the one or more peaks-only elemental standards are found using laboratory procedures to find a pure elemental standard for any selected element.

10. The system of claim 9, wherein the background is removed from the pure elemental standard to form the peaks-only elemental standard.

11. The system of claim 1, wherein the one or more gamma ray scintillator detectors detect one or more gamma rays emitted from the shielding layer.

12. The system of claim 11, wherein the information handling system is further configured to determine a porosity of a formation based at least in part on the one or more gamma rays emitted from the shielding layer.

13. The system of claim 1, wherein the pulsed neutron generator is controlled by the information handling system to generate neutrons with ON and OFF states based on a pulsing scheme.

14. A method comprising:
obtaining a gamma ray spectrum;
removing a background from the gamma ray spectrum to form a peaks-only spectrum; and
comparing one or more peaks-only elemental standards to the peaks-only spectrum to determine an elemental weight and yield.

15. The method of claim 14, further comprising identifying a minerology or a lithology from the elemental weight and yield.

16. The method of claim 15, further comprising determining a porosity of a formation based at least in part on the peaks-only spectrum.

17. The method of claim 14, wherein the one or more peaks-only elemental standards are found using laboratory procedures to find a pure elemental standard for any selected element.

18. The method of claim 17, wherein the background is removed from the pure elemental standard to form the peaks-only elemental standard.

19. The method of claim 18, wherein the background is removed using a sensitive nonlinear iteration peak algorithm.

20. The method of claim 14, wherein an elemental window is selected in which the comparing one or more peaks-only elemental standards to the peaks-only spectrum is performed.

* * * * *